United States Patent [19]  
Greve et al.

[11] Patent Number: 4,675,388  
[45] Date of Patent: Jun. 23, 1987

[54] POLYMERIC AZO COMPOUNDS CONTAINING AT LEAST FOUR CATIONIC GROUPS

[75] Inventors: Manfred Greve, Dornach; Emil J. Moriconi, Basel; Helmut Moser, Oberwil, all of Switzerland

[73] Assignee: Sandoz Ltd., Basel, Switzerland

[21] Appl. No.: 670,629

[22] Filed: Nov. 13, 1984

Related U.S. Application Data

[63] Continuation-in-part of Ser. No. 550,900, Nov. 10, 1983, abandoned.

[30] Foreign Application Priority Data

Nov. 11, 1982 [DE] Fed. Rep. of Germany ....... 3241728

[51] Int. Cl.[4] ............... C09B 44/02; C09B 44/10; C09B 44/12; C09B 44/14
[52] U.S. Cl. .................. 534/608; 534/603; 534/604; 534/605; 534/614; 534/615
[58] Field of Search ............. 534/573, 603, 604, 605, 534/608, 614, 615

[56] References Cited

U.S. PATENT DOCUMENTS 3,869,441 3/1975 Hughes .................. 260/156
3,890,257 6/1975 James .................... 260/148
4,087,244 5/1978 Greve et al. ............. 8/41

FOREIGN PATENT DOCUMENTS 24321 3/1981 European Pat. Off. ......... 534/573
1296857 11/1972 United Kingdom ........... 534/573
1550830 8/1979 United Kingdom ........... 534/573

Primary Examiner—Floyd D. Higel  
Attorney, Agent, or Firm—Gerald D. Sharkin; Richard E. Vila; Melvyn M. Kassenoff

[57] ABSTRACT

Polymers comprising two the more recurring units of formula

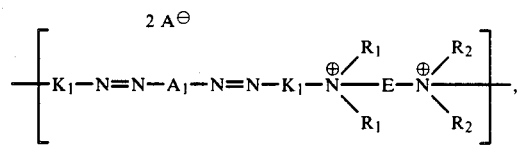

wherein
- $A_1$ is an aromatic bridging group
- each $K_1$ is independently the radical of a coupling component,
- E is an aliphatic, aromatic or aromatic heterocyclic bridging radical,
- each $R_1$ and $R_2$ is independently $C_{1-4}$alkyl substituted $C_{1-4}$alkyl, $C_{3-6}$alkenyl or substituted $C_{3-6}$alkenyl or both $R_1$'s together with the nitrogen atom to which they are attached and/or both $R_2$3 s together with the nitrogen atom to which they are attached form a morpholinium, piperidinium or pyrrolidinium group, and
- each $A^\ominus$ is independently a non-chromophoric anion, are useful as dyes, particularly for dyeing paper and leather.

17 Claims, No Drawings

POLYMERIC AZO COMPOUNDS CONTAINING AT LEAST FOUR CATIONIC GROUPS

This application is a continuation-in-part of application Ser. No. 550,900, filed Nov. 10, 1983 and now abandoned.

The invention relates to polyazo compounds containing at least four cationic groups, suitable for use as dyestuffs.

According to the invention there are provided polymers comprising two or more recurring units of formula I

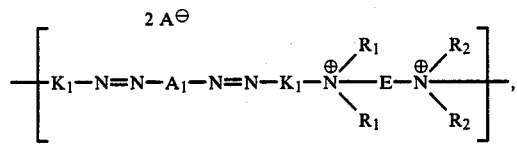

in which
A₁ is an aromatic bridging group;
K₁ is a residue of a coupling component;
E is an aliphatic, aromatic or aromatic heterocyclic bridging group;
R₁ and R₂ is selected from unsubstituted and substituted $C_{1-4}$alkyl and $C_{3-6}$alkenyl; or
both R₁s together with the N-atom to which they are attached and/or both R₂s together with the N-atom to which they are attached form a morpholine, piperidine or pyrrolidine group; and
$A^{\ominus}$ is a non-chromophoric anion;
with the proviso that recurring units are linked in such a way that K₁ of one unit is attached to an R₂ bearing N-atom of another unit.

In this Specification where a symbol appears more than once in a formula, unless indicated to the contrary, its significances are independent of one another.

Preferably R₁ is R₁' where R₁' is $C_{1-4}$alkyl, unsubstituted or monosubstituted by phenyl; or $C_{2-4}$alkyl monosubstituted by —OH or halogen;
or both R₁'s together with the N-atom to which they are attached form unsubstituted morpholine, unsubstituted piperidine or unsubstituted pyrrolidine;
more preferably R₁ is R₁'' where R₁'' is methyl or ethyl or both R₁''s together with the N-atom to which they are attached form unsubstituted morpholine.

Most preferably R₁ is —CH₃.

Preferably R₂ is R₂' where R₂' has a non-cyclic significance or R₁' independently of R₁'. More preferably R₂ is R₂'' where R₂'' is methyl or ethyl, most preferably —CH₃.

Preferably K₁ is K₁' where K₁' is selected from radicals of the formulae K_a to K_f

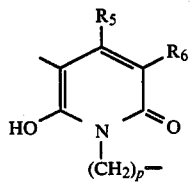

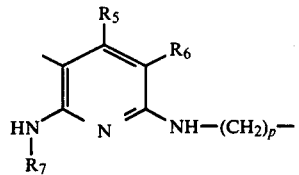

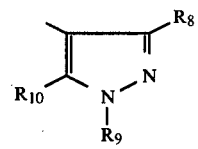

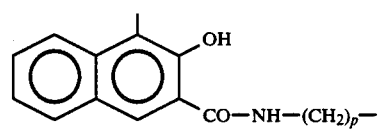

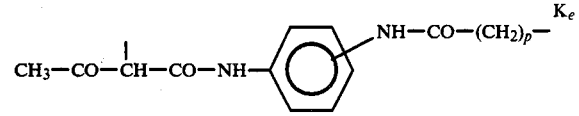

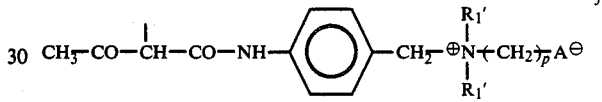

in which
R₁' is as defined above;
R₅ is unsubstituted $C_{1-4}$alkyl, unsubstituted benzyl or unsubstituted phenyl;
R₆ is hydrogen, —CN,

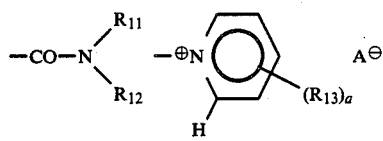

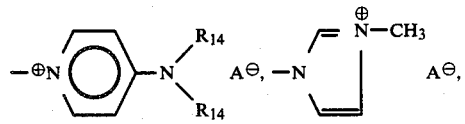

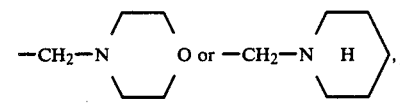

R₇ is hydrogen, di($C_{1-4}$alkyl)amino$C_{1-4}$alkyl), $C_{1-4}$alkoxy-$C_{1-4}$alkyl or $C_{1-4}$alkyl unsubstituted or monosubstituted by OH;
R₈ is unsubstituted $C_{1-4}$alkyl or

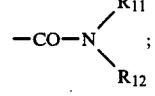

R₉ is —(CH₂)$_p$— or

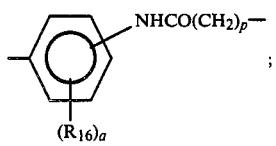

$R_{10}$ is —OH or —NH$_2$; a is 0, 1 or 2;

$R_{11}$ and $R_{12}$ independently are selected from hydrogen or unsubstituted $C_{1-4}$alkyl or $R_{11}$ and $R_{12}$ together with the N-atom to which they are attached form unsubstituted pyrrolidine, piperidine or morpholine;

$R_{13}$ is —CON($R_{14}$)$_2$ and $C_{1-4}$alkyl unsubstituted or monosubstituted by hydroxy;

$R_{14}$ is hydrogen or unsubstituted $C_{1-4}$alkyl; or both $R_{14}$ s together with the N-atom to which they are attached form unsubstituted pyrrolidine, piperidine or morpholine;

$R_{16}$ is halogen, unsubstituted $C_{1-4}$alkyl or unsubstituted $C_{1-4}$alkoxy; and p is an integer from 1 to 6 inclusive.

More preferably $K_1$ is $K_1''$ where each $K_1''$ independently is selected from radicals of the formulae $K_a'$, $K_c'$ and $K_d'$

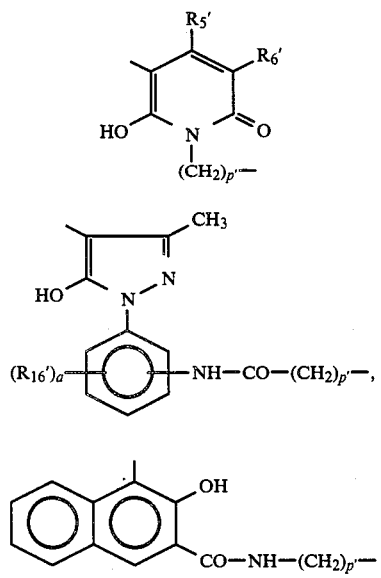

in which $R_5'$ is —CH$_3$ or

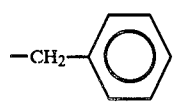

(preferably —CH$_3$) $R_6'$ is —CN, —CONR$_{11}'$R$_{12}'$;

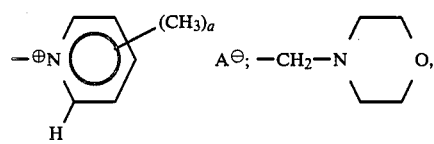

-continued

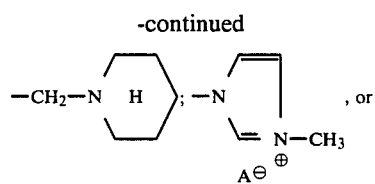

$A^\ominus$, where $R_{20a}$ is —CONH$_2$—CON($C_{1-2}$alkyl)$_2$ or 4—N(CH$_3$)$_2$, each $R_{11}'$ and $R_{12}'$ independently is hydrogen, methyl or ethyl;

each $R_{16}'$ is chloro, bromo, methyl, ethyl, methoxy or ethoxy; and p' is 1, 2, 3 or 4.

Most preferably K, is $K_1'''$ where $K_1'''$ is selected from radicals of the formulae $K_a''$, $K_c''$ and $K_d''$

[Structures: $K_a''$, $K_c''$, $K_d''$]

where $R_6''$ is —CN, —CO—NH$_2$,

[Structure: pyridinium with $A^\ominus$]

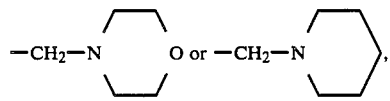

and p'' is 2 or 3.

Preferably K''' is $K_a''$ defined above.

Preferably $A_1$ is $A_1'$ where $A_1'$ is a group of formula II, III, IIa or IIIa

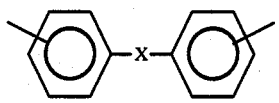 (II)

 (IIa)

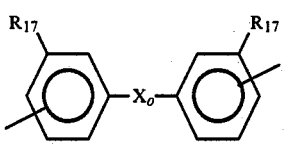 (III)

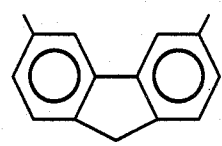 (IIIa)

in which
R$_{17}$ is halogen, unsubstituted C$_{1-4}$alkyl or unsubstituted C$_{1-4}$alkoxy;
X is a group of formula X$_1$–X$_{64}$
X$_1$ a direct bond,
X$_2$ a linear or branched C$_{1-4}$alkylene group, $$X_3 \text{—CO—}, X_4 \text{—NH—}\overset{\underset{\|}{S}}{C}\text{—NH—}, X_5 \text{—S—}, X_6 \text{—O—},$$

$$X_7 \text{—CH=CH—}, X_8 \text{—S—S—}, X_9 \text{—SO}_2\text{—}, X_{10} \text{—NH—},$$

$$X_{11} \text{—NH—CO—}, X_{12} \text{—}\underset{\underset{CH_3}{|}}{N}\text{—CO—}, X_{13} \text{—}\overset{\underset{H}{\bigcirc}}{C}\text{—},$$

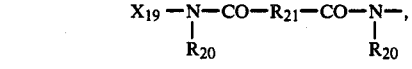

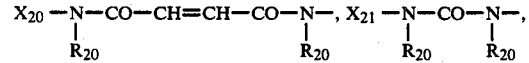

-continued
X$_{22}$ —CO—NH—NH—CO—,
X$_{23}$ —CH$_2$CO—NH—NH—CO—CH$_2$—,
X$_{24}$ —CH=CH—CO—NH—NH—CO—CH=CH—,

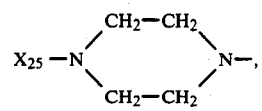

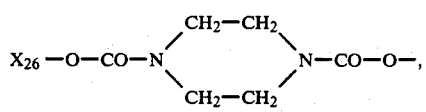

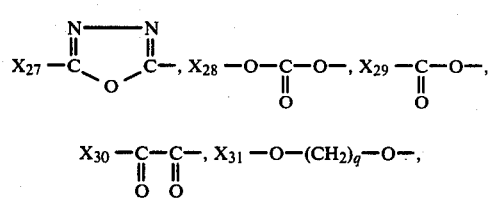

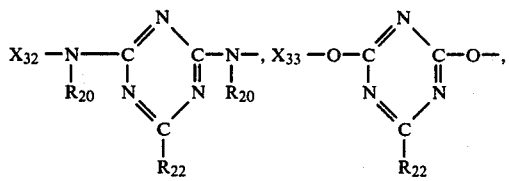

X$_{34}$ —CO—N(R$_{20}$)—R$_{21}$—N(R$_{20}$)—CO—,

X$_{35}$ —CO—N(R$_{20}$)—(CH$_2$)$_q$—O—(CH$_2$)$_q$—N(R$_{20}$)—CO—,

X$_{36}$ —CO—N(R$_{20}$)—(CH$_2$)$_q$—N(R$_{20}$)—(CH$_2$)$_q$—N(R$_{20}$)—CO—,

X$_{37}$ —CO—N(R$_{20}$)—(CH$_2$)$_q$—O—(CH$_2$)$_q$—O—(CH$_2$)$_q$—N(R$_{20}$)—CO—,

X$_{38}$ —CH$_2$—CO—N(R$_{20}$)—, X$_{39}$ —CH=CH—CO—N(R$_{20}$)—,

X$_{40}$ —N=N—, X$_{41}$ —CH$_2$—S—CH$_2$—, X$_{42}$ —SO—,

X$_{43}$ —CH$_2$—SO—CH$_2$—, X$_{44}$ —CH$_2$—SO$_2$—CH$_2$—,
X$_{45}$ —CH$_2$—NH—CO—NH—CH$_2$—,
X$_{46}$ —CH$_2$—NH—CS—NH—CH$_2$—,

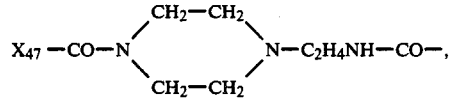

X$_{48}$ —CH$_2$—CH$_2$—CO—N(R$_{20}$)—, X$_{49}$ —CH$_2$—CO—CH$_2$—,

X$_{50}$ —CH=CH—CH=CH—,

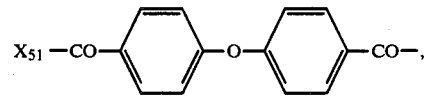

-continued

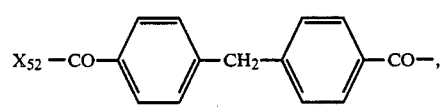

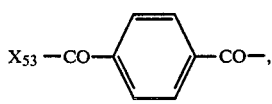

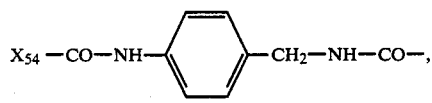

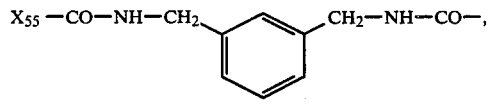

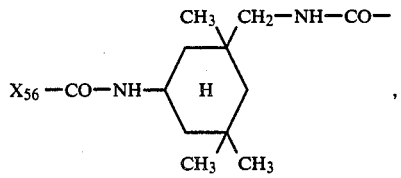

$X_{58}$ —CH$_2$—CO—, $X_{59}$ —CH=CH—CO—CH=CH—,

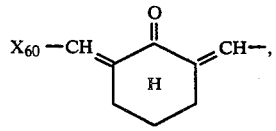

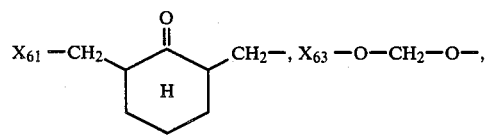

$X_{64}$ —CO—NH—R$_{21}$—CO—NH—, $X_o$ is $X_1$, $X_2$, $X_{14}$, $X_{21}$, $X_{32}$ or $X_{34}$;
$R_{19}$ is halogen, unsubstituted $C_{1-4}$alkyl or unsubstituted $C_{1-4}$alkoxy;
$R_{20}$ is hydrogen or unsubstituted $C_{1-4}$alkyl;
$R_{21}$ is a linear or branched $C_{1-4}$alkylene group;
$R_{22}$ is halogen, —NHCH$_2$CH$_2$OH or —N(CH$_2$CH$_2$OH)$_2$; and
q is 1, 2, 3 or 4.

More preferably $A_1$ is $A_1''$ where $A_1''$ is a group of formula II' or III'

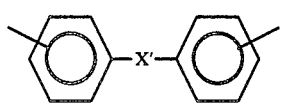 (II')

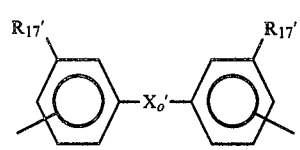 (III')

in which $R_{17}'$ is chloro, bromo, methyl, ethyl, methoxy or ethoxy;

$X'$ is $X_1$, $X_5$, $X_6$, $X_7$, $X_{10}$, $X_{11}$, $X_{12}$, $X_{16}$, $X_{17}$, $X_{22}$, $X_{25}$, $X_{26}$, $X_{27}$, $X_{30}$, $X_{31}$, $X_{49}$, $X_{50}$, $X_{51}$, $X_{52}$, $X_{53}$, $X_{54}$, $X_{58}$, $X_{59}$, $X_2'$ —CH$_2$—, $X_2''$ —(CH$_2$)$_2$—, $X_2'''$ —(CH$_2$)$_3$—, $X_2^{iv}$ —(CH$_2$)$_4$—, $X_{14}'$ —CO—NH—⟨◯⟩—NH—CO—, $X_{15}'$ —CO—NH—⟨◯⟩$\genfrac{}{}{0pt}{}{R_{19}'}{NH-CO-}$ , $X_{19}'$ —NH—CO—CH$_2$CH$_2$—CO—NH—, $X_{19}''$ —NH—CO—(CH$_2$)$_4$—CO—NH—, $X_{19}'''$ —N(CH$_3$)—CO—(CH$_2$)$_2$—CO—N(CH$_3$)—, $X_{20}'$ —NH—CO—CH=CH—CO—NH—, $X_{20}''$ —N(CH$_3$)—CO—CH=CH—CO—N(CH$_3$)—, $X_{21}'$ —NH—CO—NH—, $X_{21}''$ —N(CH$_3$)—CO—N(CH$_3$)—, $X_{32}'$ —N(CH$_3$)—C(=N—C(R$_{22}'$)=N—)—N(CH$_3$)—

$X_{32}''$ —NH—C(=N—C(R$_{22}'$)=N—)—NH—, $X_{34}'$ —CO—NH—(CH$_2$)$_2$—NH—CO—, $X_{34}''$ —CO—NH—(CH$_2$)$_3$—NH—CO—, $X_{34}'''$ —CO—NH—(CH$_2$)$_4$—NH—CO—, $X_{34}^{iv}$ —CO—N(CH$_3$)—(CH$_2$)$_2$—N(CH$_3$)—CO—, $X_{34}^{v}$ —CO—NH—CH$_2$—CH(CH$_3$)—NH—CO—, $X_{34}^{vi}$ —CO—NH—CH(CH$_3$)—CH(CH$_3$)—NH—CO—.

$X_0'$ $X_1'$, $X_2'$, $X_2''$, $X_{14}'$, $X_{21}'$ or $X_{34}'$;

$R_{19}'$ is hydrogen, chloro, methyl or methoxy; and $R_{22}'$ is Cl, —NHCH$_2$CH$_2$OH or —N(CH$_2$CH$_2$OH)$_2$.

Most preferably $A_1$ is $A_1'''$ where $A_1'''$ is a group of formula II'' or III''

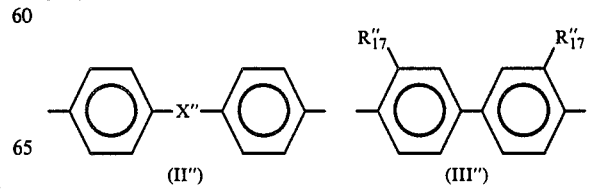

(II'') (III'')

in which $R_{17}''$ is chloro, methyl or methoxy; and

X''' is $X_1$, $X_{10}$, $X_{11}$, $X_{12}$, $X_{17}$, $X_{27}$, $X_{51}$, $X_{52}$, $X_{54}$, $X_{64}$, $X_2'$, $X_2''$, $X_{14}'$, $X_{19}'$, $X_{19}''$, $X_{19}'''$, $X_{20}'$, $X_{20}''$, $X_{21}'$, $X_{32}'$, $X_{34}'$, $X_{34}''$, $X_{34}'''$, $X_{34}^{iv}$, $X_{34}^{v}$ or $X_{34}^{vi}$.
E is preferably E' where E' is $E_1$ to $E_{70}$
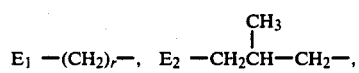
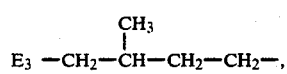
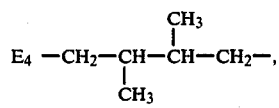
$E_5$ —CH$_2$—CH$_2$—Y—CH$_2$—CH$_2$—,
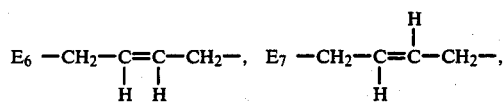
$E_8$ —CH$_2$—CH$_2$—CH=CH—CH$_2$—,
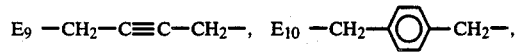
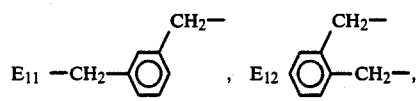
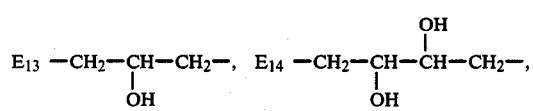
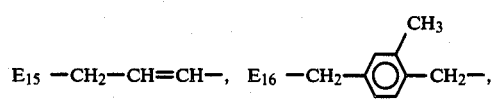
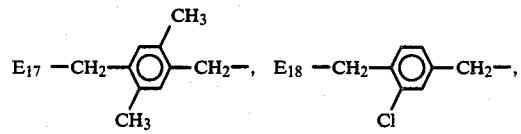
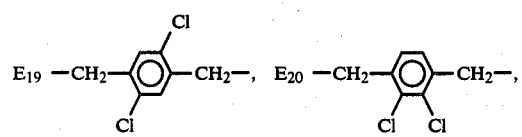
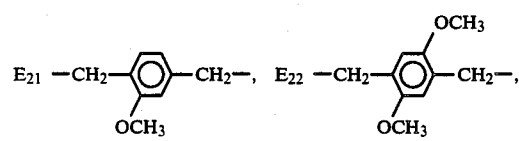
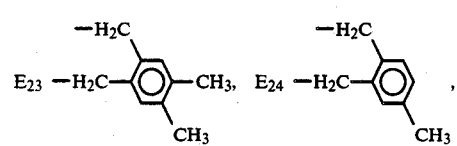
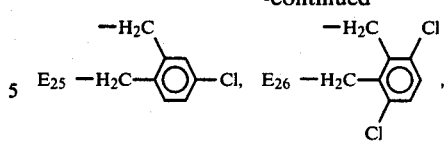
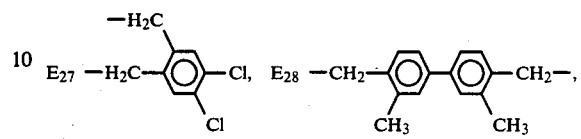
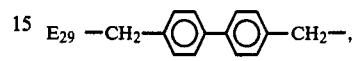
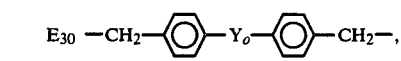
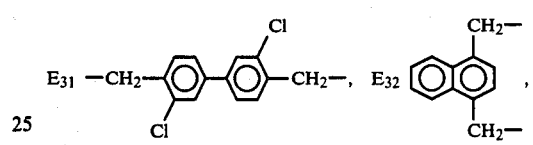
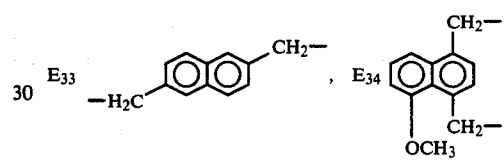
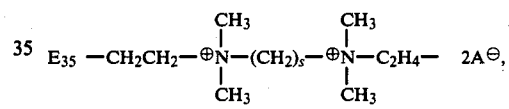
$E_{36}$ —CH$_2$—CH$_2$—O—CH$_2$—CH$_2$—CH$_2$—,
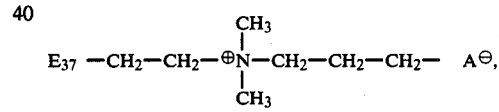
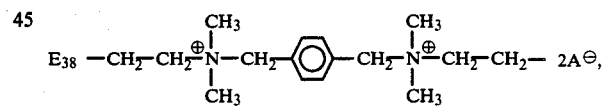
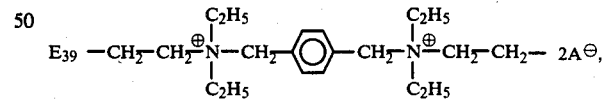
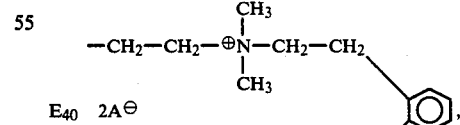
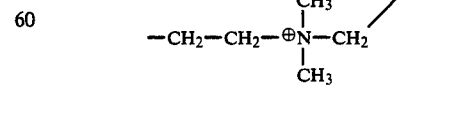
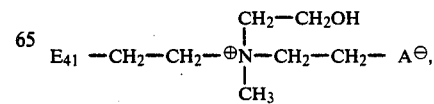

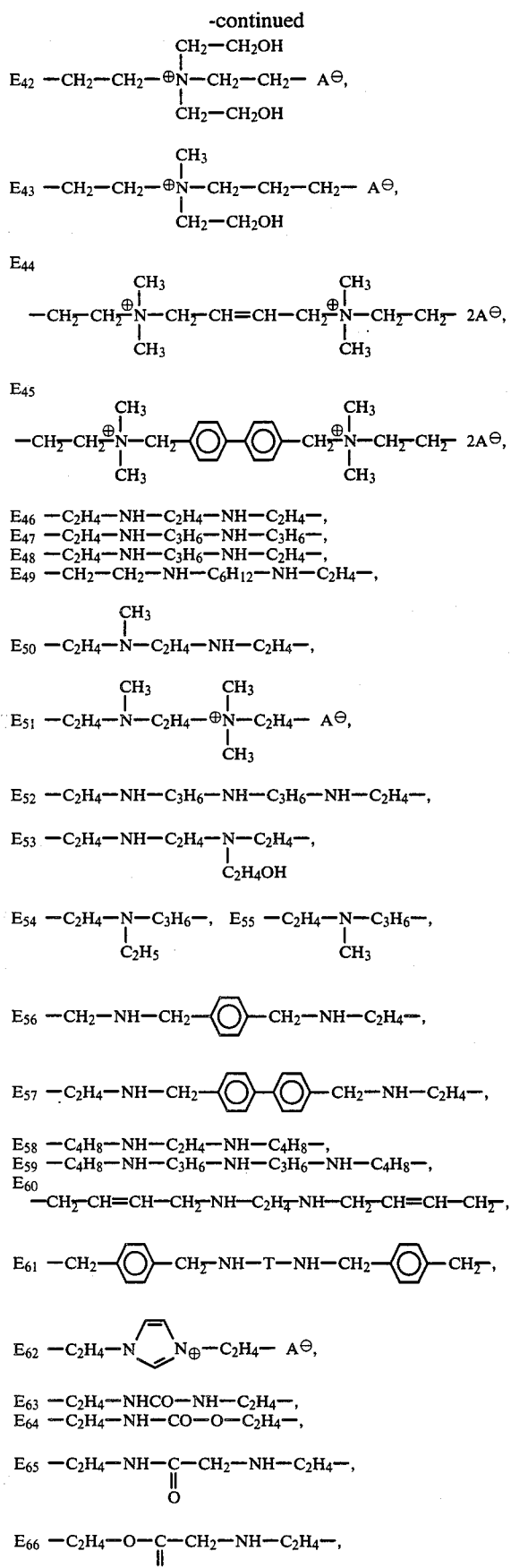
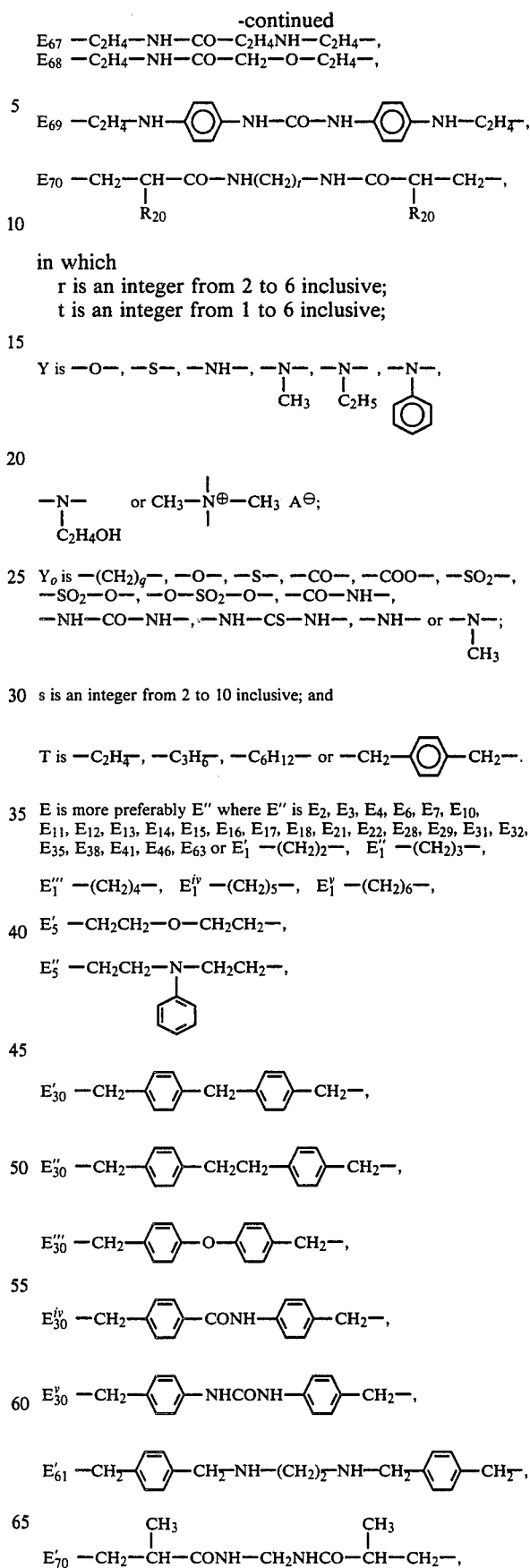

in which
r is an integer from 2 to 6 inclusive;
t is an integer from 1 to 6 inclusive;

Y is —O—, —S—, —NH—, —N—, —N—, —N—,
                         |    |    |
                         CH₃  C₂H₅ C₆H₅

—N—     or  CH₃—N⊕—CH₃  A⊖;
|            |
C₂H₄OH       |

$Y_o$ is —(CH₂)$_q$—, —O—, —S—, —CO—, —COO—, —SO₂—, —SO₂—O—, —O—SO₂—O—, —CO—NH—, —NH—CO—NH—, —NH—CS—NH—, —NH— or —N—;
                                                                                                                    |
                                                                                                                    CH₃ s is an integer from 2 to 10 inclusive; and

T is —C₂H₄—, —C₃H₆—, —C₆H₁₂— or —CH₂—⌬—CH₂—.

E is more preferably E″ where E″ is E₂, E₃, E₄, E₆, E₇, E₁₀, E₁₁, E₁₂, E₁₃, E₁₄, E₁₅, E₁₆, E₁₇, E₁₈, E₂₁, E₂₂, E₂₈, E₂₉, E₃₁, E₃₂, E₃₅, E₃₈, E₄₁, E₄₆, E₆₃ or E′₁ —(CH₂)₂—, E″₁ —(CH₂)₃—, E‴₁ —(CH₂)₄—, E$_1^{iv}$ —(CH₂)₅—, E$_1^v$ —(CH₂)₆—, -continued $E''_{70}$ —$CH_2$—$CH_2$—CO—NH—$(CH_2)_2$—NH—CO—$CH_2$—$CH_2$—.

E is most preferably E''' where E''' is $E_2$, $E_3$, $E_4$, $E_6$, $E_7$, $E_{10}$, $E_{11}$, $E_{12}$, $E_{13}$, $E_{14}$, $E_{16}$, $E_{21}$, $E_{28}$, $E_{29}$, $E_{31}$, $E_1'''$, $E_1''''$, $E_1^v$, $E_5'$, $E_5'''$, $E_{30}'$, $E_{30}''$, $E_{30}'''$ or $E_{70}''$.

In this specification unless indicated to the contrary any alkyl group is preferably methyl or ethyl, any alkoxy is preferably methoxy or ethoxy and any halogen is preferably chloro or bromo, more preferably the former. Further, where a symbol appears more than once in a formula, unless indicated to the contrary, its significances are independent of one another.

In the definitions of E, E' and E'' any alkylene groups present are linear or branched unless indicated to the contrary.

Preferred polymers of the invention contain 2 to 25 recurring units of formula IV

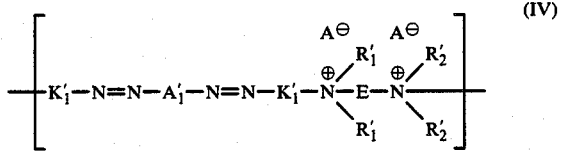

More preferred polymers of the invention are those containing 2 to 10 recurring units of formula IV'

Representative polymers of formula IV are those wherein $R_6$ is hydrogen, cyano, —$CONR_{11}R_{12}$,

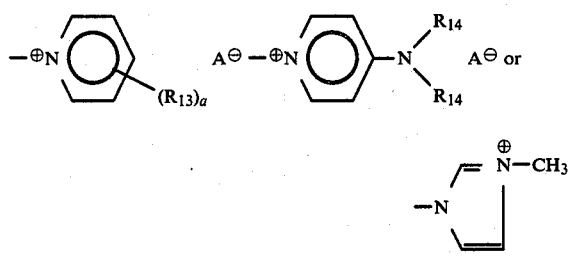

$A^\ominus$.

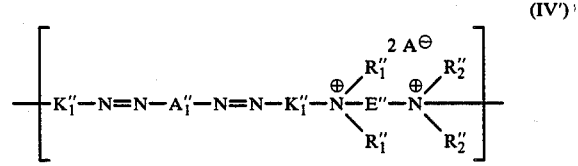

Representative polymers of Formula IV' are those wherein
$R_5'$ is methyl,
$R_6'$ is cyano, —$CONR_{11}'R_{12}'$ or

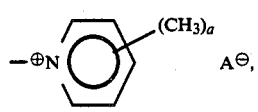

and
X' is other than —NHCO—.

Most preferred polymers of the invention are those containing 3 to 6 recurring units of formula IV'''

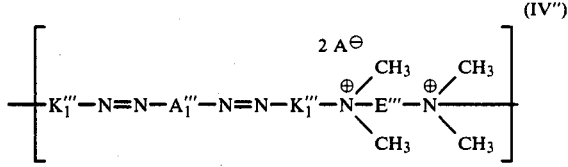

Representative polymers of formula IV'' are those wherein
$R_6''$ is cyano, —$CONH_2$ or

and
X'' is other than —NHCO—.

Polymers according to the invention may be linear polymers of units of formula I in which the terminal $K_1$ groups are attached to

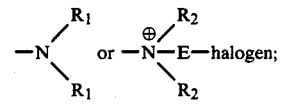

or cyclic polymers of units of formula I or mixtures of linear and/or cyclic polymers.

Preferably polymers of formula I contain 2 to 25 recurring units, more preferably 2 to 10 recurring units, most preferably 3 to 10 recurring units, especially 3 to 6 recurring units.

Preferably polymers of formula IV contain 2 to 10 recurring units, more preferably 3 to 10 recurring units, most preferably 3 to 6 recurring units.

Preferably polymers of formula IV' contain 3 to 10 recurring units, most preferably 3 to 6 recurring units.

The polymers of the invention can be prepared according to known methods by reacting two or more corresponding disazo compounds having at least two protonatable or quaternisable basic groups together in such a way that the two protonatable or quaternisable basic groups are protonated or quaternised thereby linking the disazo compounds together. The resulting polymers (and mixtures thereof) can be formed in an aqueous suspension according to known methods and isolated.

It is believed that one can control the probability of products of the invention being cyclic or linear by applying the Ziegler-Ruggli dilution principle. When the reactants are in concentrated form there is a tendency to form a linear product and when the reactants are in dilute form there is a tendency to form a cyclic product.

In the polymers according to the invention the anion $A^\ominus$ may be exchanged for other anions, e.g. with the aid of an ion exchanger or by means of a reaction with salts or acids or in accordance with German Published Application Nos. 2,001,748 and 2,001,816.

The anion $A^\ominus$ may be a non-chromophoric anion which is usual in basic dyestuff chemistry.

The anion $A^\ominus$ includes both organic and inorganic ions, e.g. halide, such as chloride or bromide, sulphate, bisulphate, methyl sulphate, aminosulphonate, perchlorate, benzenesulphonate, oxalate, maleinate, acetate, propionate, lactate, succinate, tartrate, malate, methanesulphonate or benzoate ions, or complex anions, such as those of zinc chloride double salts, and also the anions of the following acids: boric acid, citric acid, glycolic acid, diglycolic acid and adipic acid and addition products of ortho-boric acid with polyalcohols or cispolyols.

The polymers according to the invention may be used in quaternised form and/or in the form of the corresponding salts of mineral acids or organic acids directly as dyestuffs or they may be used in the form of aqueous, e.g. concentrated stable, solutions or as granules for dyeing all types of fibre material, cellulose, cotton and leather, but especially paper and paper products and bast fibres such as hemp, flax coir, sisal, jute and straw.

The dyestuffs may also be employed in the production of bulk-dyed, sized and unsized paper. They must be similarly employed for dyeing paper by the dipping process.

Paper, leather and cellulose are dyed in accordance with known methods.

In paper production, the new dyestuffs and their preparations do not colour the back water at all, or only slightly. This is advantageous for purifying the back water. The dyestuffs are highly substantive and dyeings produced on paper do not mottle and are substantially insensitive to pH. Paper dyeings with polymers of the invention have good light fastness properties. After exposure to light for a long time the shade alters tone-in-tone. The dyed papers are wet-fast not only to water, but also to milk, soap, water, sodium chloride solution, fruit juices and sweetened mineral water. Because of their good alcohol fastness, they are also resistant to alcoholic beverages. Paper dyeings with polymers of the invention have very stable shades.

Polymers according to the invention may be used for dyeing, padding or printing polyacrylonitrile textiles, or polyamide or polyester textiles which are modified by anionic groups.

The entire specification of parent application Ser. No. 06/550,900, now abandoned, particularly pages 1 to 18, is hereby incorporated by reference as if it were set forth in its entirety.

In the following Examples all parts and percentages are by weight and all temperatures are in °C. unless indicated to the contrary. In the Examples where E is an alkylene group capable of being linear or branched it is linear. The anion in the Examples can be any nonchromophoric anion and is $CH_3CO_2^{\ominus}$ in the Examples given.

EXAMPLE 1

22.7 g (0.1 mole) of 4,4'-diaminobenzanilide are dissolved at 90° in a beaker containing 200 ml of water and 50 ml of 10N hydrochloric acid. After cooling, 51 ml of a 4N sodium nitrite solution are added dropwise to the suspension at 0° to 5°, over the course of 30 minutes. After the addition of the nitrite, the mixture is stirred for 10 minutes, and the unspent nitrous acid is then decomposed with aminosulphonic acid. The diazonium salt solution is then filtered by adding decolourising carbon. A coupling solution consisting of 48 g (0.206 mole) of 6-hydroxy-4-methyl-3-cyano-1-(3'-dimethylaminopropyl)-pyridone(2) which is dissolved in 200 ml of water, is added evenly over 60 minutes to the diazonium salt solution which is diluted with 2 liters of ice water. After coupling, stirring is continued for another 3 hours at room temperature, and the separated dyestuff is filtered and vacuum dried. 27 g of the disazo dyestuff obtained, corresponding to a titre of 80% to 0.03 mole of disazo dyestuff, are suspended in 200 ml of ethyl glycol, and then brought almost totally into solution by heating to 50° and adding 100 ml of 20% aqueous sodium carbonate solution. 5.3 g of α,α'-dichloro-p-xylene (0.0303 mole) are added, and the mixture is stirred for 4 hours at 65° and then for 12 hours at room temperature. The precipitated polymeric dyestuff is filtered and vacuum dried.

The polyazo dyestuff has 3 to 6 recurring units of the formula

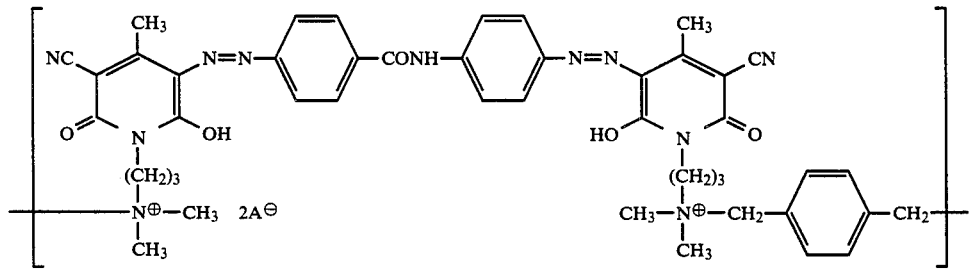

When dyed on polyacrylonitrile, cotton, leather and paper from solution containing acetic acid, the dyestuff produces reddish-yellow dyeings. When dyeing paper, the waste water is practically colourless. The dyed paper is notable for its excellent wet fastness. The same dyestuff may be obtained by firstly linking by quaternisation 0.06 mole of coupler as described with 0.03 mole of α,α'-dichloroparaxylene in ethylene glycol, and then coupling 0.03 mole of diazotised 4,4'-diaminobenzanilide with the biscationic coupler thus obtained.

EXAMPLES 2 TO 56

Compounds containing 3 to 6 recurring units of formula 1

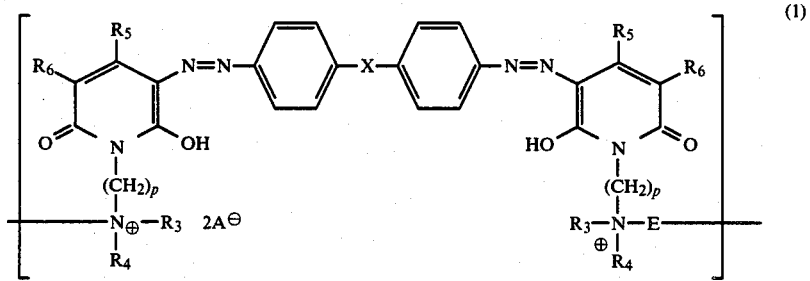

(1)

in which the symbols are defined in Table 1 may be prepared by a method analogous to that of Example 1 from known products.

TABLE 1

| Example | $R_3$ | $R_4$ | $R_5$ | $R_6$ | p | E | X |
|---|---|---|---|---|---|---|---|
| 2 | —CH$_3$ | —CH$_3$ | —CH$_3$ | —CN | 3 | $E_2$ | $X_{11}$ |
| 3 | " | " | " | " | " | $E_6$ | " |
| 4 | " | " | " | " | " | $E_{13}$ | " |
| 5 | " | " | " | " | " | $E_1''$ | " |
| 6 | " | " | " | " | " | $E_1'''$ | " |
| 7 | " | " | " | " | " | $E_2$ | $X_1$ |
| 8 | " | " | " | " | " | $E_6$ | " |
| 9 | " | " | " | " | " | $E_{10}$ | " |
| 10 | " | " | " | " | " | $E_{13}$ | " |
| 11 | " | " | " | " | " | $E_1''$ | " |
| 12 | " | " | " | " | " | $E_1'''$ | " |
| 13 | " | " | " | " | " | $E_2$ | $X_{21}'$ |
| 14 | " | " | " | " | " | $E_6$ | " |
| 15 | " | " | " | " | " | $E_{10}$ | " |
| 16 | " | " | " | " | " | $E_{13}$ | " |
| 17 | " | " | " | " | " | $E_1''$ | " |
| 18 | " | " | " | " | " | $E_1'''$ | " |
| 19 | " | " | " | " | " | $E_2$ | $X_2'$ |
| 20 | " | " | " | " | " | $E_6$ | " |
| 21 | " | " | " | " | " | $E_{10}$ | " |
| 22 | " | " | " | " | " | $E_{13}$ | " |
| 23 | " | " | " | " | " | $E_1''$ | " |
| 24 | " | " | " | " | " | $E_1'''$ | " |
| 25 | " | " | " | " | " | $E_2$ | $X_2''$ |
| 26 | " | " | " | " | " | $E_6$ | " |
| 27 | " | " | " | " | " | $E_{10}$ | " |
| 28 | " | " | " | " | " | $E_{13}$ | " |
| 29 | " | " | " | " | " | $E_1''$ | " |
| 30 | " | " | " | " | " | $E_1'''$ | " |
| 31 | " | " | " | " | " | $E_2$ | $X_{34}'$ |
| 32 | " | " | " | " | " | $E_6$ | " |
| 33 | " | " | " | " | " | $E_{10}$ | " |
| 34 | " | " | " | " | " | $E_{13}$ | " |
| 35 | " | " | " | " | " | $E_1''$ | " |
| 36 | " | " | " | " | " | $E_1'''$ | " |
| 37 | " | " | " | " | " | $E_2$ | $X_{34}''$ |
| 38 | " | " | " | " | " | $E_6$ | " |
| 39 | " | " | " | " | " | $E_{10}$ | " |
| 40 | " | " | " | " | " | $E_{13}$ | " |
| 41 | " | " | " | " | " | $E_1''$ | " |
| 42 | " | " | " | " | " | $E_1'''$ | " |
| 43 | —C$_2$H$_5$ | —C$_2$H$_5$ | " | " | " | $E_6$ | $X_2'$ |
| 44 | —CH$_3$ | —CH$_2$—C$_6$H$_5$ | " | " | " | " | $X_{34}'$ |
| 45 | " | —CH$_3$ | " | " | 2 | $E_{10}$ | " |
| 46 | " | " | —CH$_2$—C$_6$H$_5$ | " | 3 | $E_{13}$ | " |
| 47 | " | " | —CH$_3$ | H | " | $E_6$ | $X_2''$ |
| 48 | " | " | " | —CONH$_2$ | " | " | $X_2'$ |

TABLE 1-continued

| Example | R₃ | R₄ | R₅ | R₆ | p | E | X |
|---|---|---|---|---|---|---|---|
| 49 | " | " | " | —CH₂—N(morpholine) | " | $E_{13}$ | " |
| 50 | " | " | " | —CH₂—N(piperidine)H | " | $E_{10}$ | $X_{34}'$ |
| 51 | " | " | " | —⊕N(pyridinium) A⊖ | " | $E_6$ | " |
| 52 | " | " | " | —⊕N(pyridinium-CH₃) A⊖ | " | " | " |
| 53 | " | " | " | —⊕N(pyridinium-N(CH₃)₂) A⊖ | " | " | " |
| 54 | " | " | " | —⊕N(pyridinium-CONH₂) A⊖ | " | " | " |
| 55 | " | " | " | —N(imidazolium N—CH₃) A⊖ | " | $E_{13}$ | " |
| 56 | " | " | " | —⊕N(pyridinium-CON(C₂H₅)₂) A⊖ | " | " | " |

EXAMPLES 57 TO 66

Compounds containing 3 to 6 recurring units of formula 2 in which the symbols are defined in Table 2 can be prepared by a method analogous to that of Example 1 from known starting products.

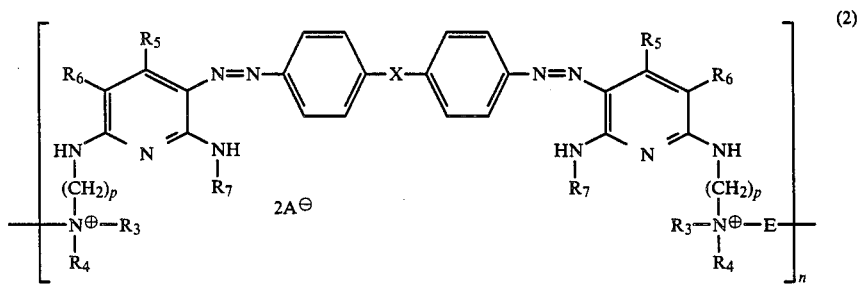

(2)

TABLE 2

| Example | R₃ | R₄ | R₅ | R₆ | R₇ | p | E | X |
|---|---|---|---|---|---|---|---|---|
| 57 | —CH₃ | —CH₃ | —CH₃ | —CN | —CH₂CH₂OH | 3 | $E_{10}$ | $X_{11}$ |
| 58 | " | " | " | " | " | " | $E_6$ | $X_{34}'$ |

TABLE 2-continued

| Example | $R_3$ | $R_4$ | $R_5$ | $R_6$ | $R_7$ | p | E | X |
|---|---|---|---|---|---|---|---|---|
| 59 | " | " | " | " | " | " | $E_{13}$ | " |
| 60 | " | " | " | " | —CH$_2$CH$_3$ | " | " | " |
| 61 | " | " | " | " | —(CH$_2$)$_3$OCH$_3$ | " | " | " |
| 62 | " | " | " | " | " | " | " | " |
| 63 | " | " | —CH$_2$—C$_6$H$_5$ | " | —CH$_2$CH$_2$OH | " | $E_{13}$ | " |
| 64 | " | " | CH$_3$ | " | " | 2 | $E_{10}$ | $X_2''$ |
| 65 | —C$_2$H$_5$ | —C$_2$H$_5$ | " | " | " | 3 | " | $X_2'$ |
| 66 | —CH$_3$ | —CH$_3$ | " | " | —(CH$_2$)$_3$N(CH$_3$)$_2$ | " | " | " |

EXAMPLES 67 TO 73

Compounds containing 3 to 6 recurring units of formula 3

EXAMPLES 74 TO 79

Compounds containing 3 to 6 recurring units of formula 4

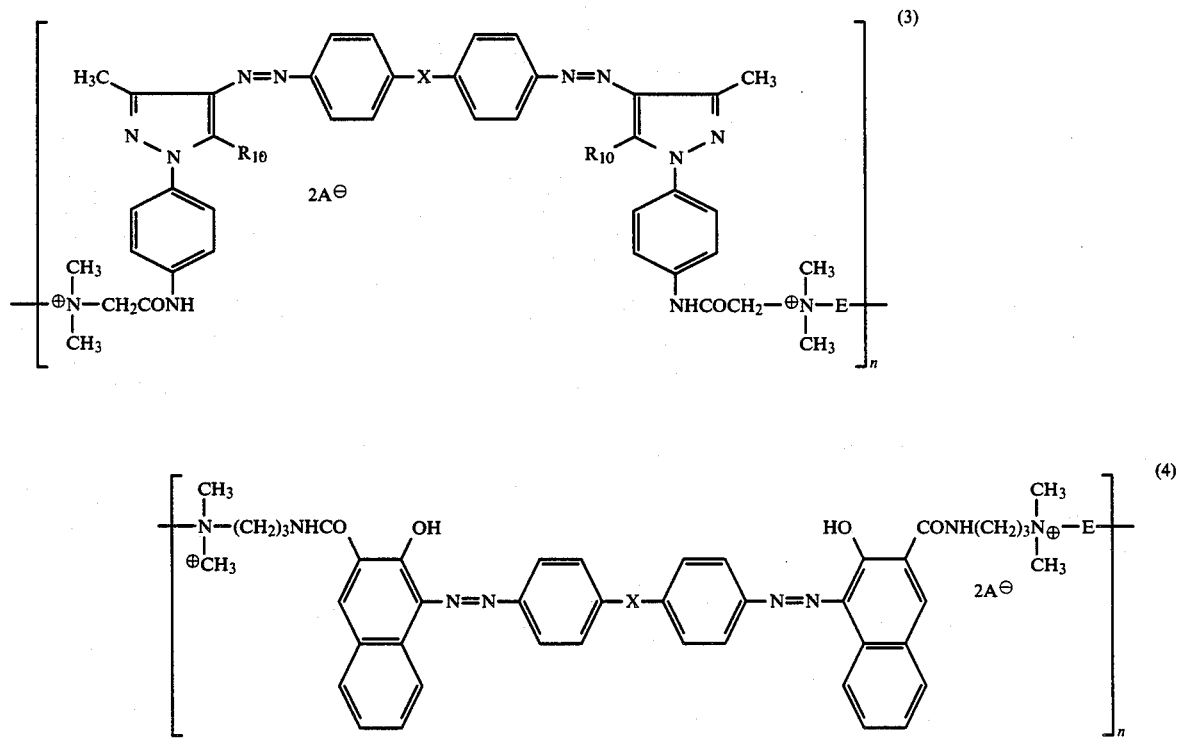

in which the symbols are defined in Table 3 can be prepared by a method analogous to that of Example 1 from known compounds.

TABLE 3

| Example | $R_{10}$ | E | X |
|---|---|---|---|
| 67 | —OH | $E_{13}$ | $X_{11}$ |
| 68 | " | $E_6$ | $X_2'$ |
| 69 | " | $E_{10}$ | $X_{34}'$ |
| 70 | " | " | $X_2''$ |
| 71 | " | $E_6$ | $X_1$ |
| 72 | —NH$_2$ | " | $X_{34}'$ |
| 73 | —NH$_2$ | " | $X_{11}$ | in which the symbols are defined in Table 4 can be prepared according to a method analogous to that of Example 1 from known starting compounds.

TABLE 4

| Example | E | X |
|---|---|---|
| 74 | $E_{10}$ | —C$_2$H$_4$— |
| 75 | " | $X_{34}'$ |
| 76 | $E_6$ | $X_2$ |
| 77 | " | $X_{34}'$ |
| 78 | $E_{13}$ | " |
| 79 | " | —C$_2$H$_4$— |

EXAMPLES 80 TO 84

Compounds containing 3 to 6 recurring units of formula 5

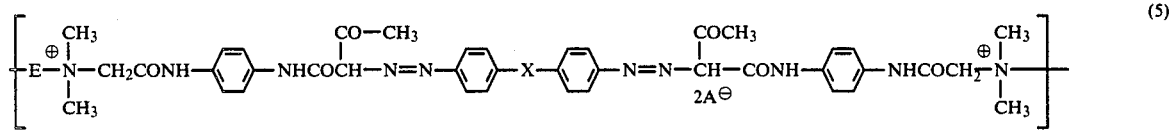
(5)

in which the symbols are defined in Table 5 can be prepared by a method analogous to that of Example 1 from known compounds.

TABLE 5

| Example | E | X |
|---------|-----|-------|
| 80 | E₁₀ | X₁ |
| 81 | E₆ | X₂' |
| 82 | " | X₃₄' |
| 83 | E₁₀ | " |
| 84 | E₁₃ | X₂" | solution and coupling occurs. After completion of the coupling reaction the pH is brought to 3.5 to 4 with NaOH solution. A further coupling solution containing 0.103 mole of 6-hydroxy-4-methyl-3-pyridinium-1-(3′-dimethylaminopropyl)pyrid-2-one in 200 ml of water is made up. This is added to the diazonium containing solution and coupling occurs. After coupling has terminated the product is treated in Example 1 except that instead of using αα′-dichloro-p-xylene an equivalent amount of 1,3-dichloropropan-2-ol is used.

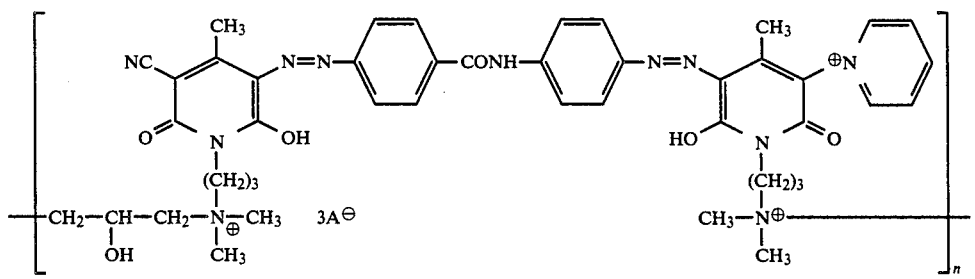

where n is 3 to 6 results.

EXAMPLE 85

0.1 mole of 4,4′-diaminobenzanilide are tetraazotised as described in Example 1. The diazonium salt solution is diluted with 2 liters of a mixture of ice and water and the pH is brought to 1 to 1.5 by adding concentrated hydrochloric acid. A first coupler solution containing 24 g (0.103 mols) of 6-hydroxy-4-methyl-3-cyano-1-(3′-dimethylamino)pyrid-2-one in 200 ml of water is made up. The coupler solution is added to the diazonium

EXAMPLES 86 TO 89

Compounds of the formulae given can be prepared from known compounds by a method analogous to that of Example 85.

EXAMPLE 86

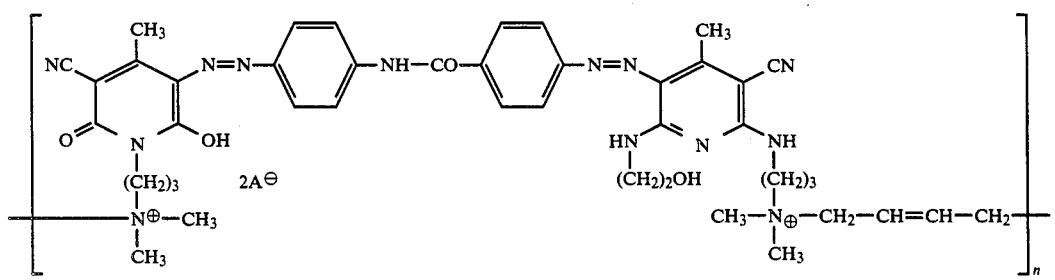

where n is 3 to 6.

EXAMPLE 87

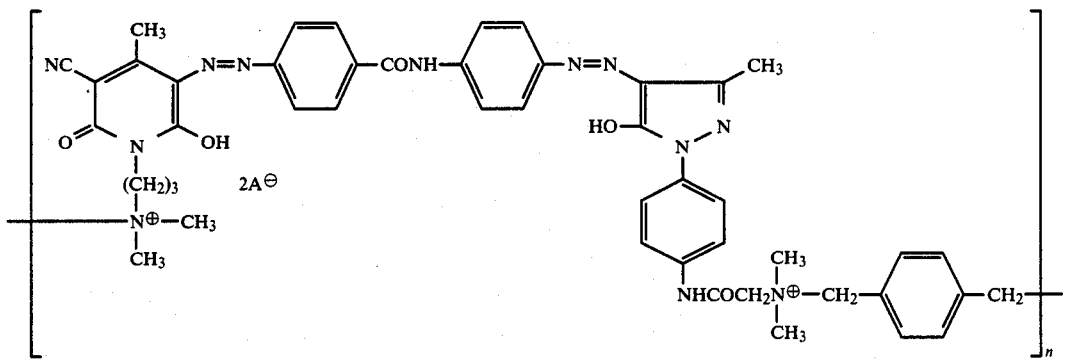

where n is 3 to 6.

EXAMPLE 88

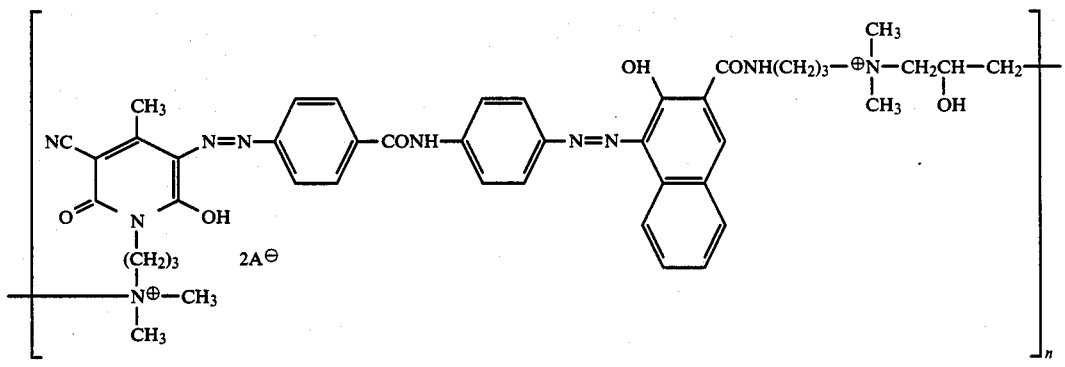

where n is 3 to 6.

EXAMPLE 89

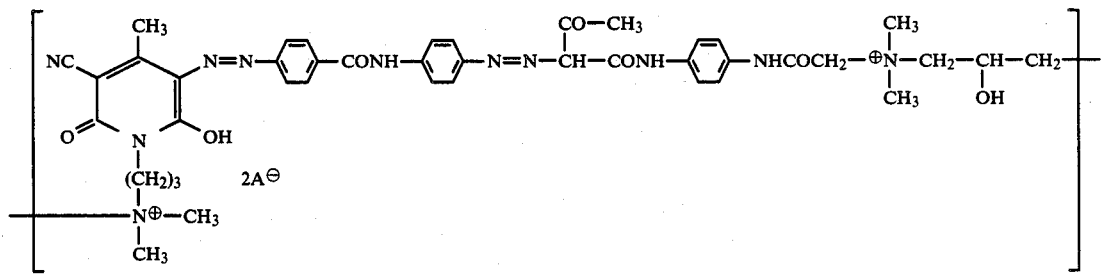

where n is 3 to 6.

The dyestuffs of Examples 2 to 73 and 80 to 89 dye paper in a yellow shade and the dyestuffs of Examples 74 to 79 dye paper a red shade.

It is believed that the Examples are predominantly linear products having terminal groups $-NR_2R_3$ and

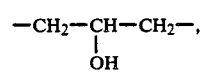

where in Example 1 and in Examples 67 to 89 $R_2$, $R_3$ and $R_4$ are $-CH_3$ and in Examples 1 and 87 E is in Examples 85, 88 and 89 E is

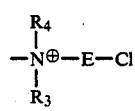

and in Example 86 E is $-CH_2-CH=CH-CH_2-$.

DYEING EXAMPLE A

70 Parts of chemically bleached sulphite cellulose (from pinewood) and 30 parts of chemically bleached sulphite cellulose (from birchwood) are ground in a Hollander in 2000 parts of water. 0.2 Parts of the dyestuff of Example 1 are sprinkled into this pulp. After mixing for 20 minutes, paper is produced from this pulp.

The absorbent paper obtained in this way is dyed reddish-yellow. The waste paper is practically colourless.

DYEING EXAMPLE B 0.5 Parts of the dyestuff of Example 1 are dissolved in 100 parts of hot water and cooled to room temperature. This solution is added to 100 parts of chemically bleached sulphite cellulose which have been ground in a Hollander with 2000 parts of water. After thorough mixing for 15 minutes, sizing takes place. Paper which is produced from this matter has a reddish-yellow shade of average intensity, with good wet fastness.

DYEING EXAMPLE C

An absorbent length of unsized paper is drawn through a dyestuff solution of the following composition at 40° to 50°: 0.5 parts of the dyestuff of Example 1, 0.5 parts of starch and 99.0 parts of water. The excess dyestuff solution is squeezed out through two rollers. The dried length of paper is dyed reddish-yellow with good fastness.

DYEING EXAMPLE D

2 Parts of the dyestuff according to Example 1 are dissolved at 40° in 4000 parts of softened water. 100 parts of premoistened cotton fabric are entered into the bath, which is heated for 30 minutes to boiling temperature. The bath is kept at boiling temperature for 1 hour, and the water which evaporates is replaced from time to time. The dyeing is then removed from the liquor, rinsed with water and dried. The dyestuff is absorbed practically quantitatively on the fibres; the dye bath is practically colourless. A reddish dyeing is obtained with good light fastness and good wet fastness.

In Dyeing Examples A to D the dye of Example 1 can be replaced by an appropriate amount of anyone of the compounds of Examples 2 to 89.

What is claimed is:

1. A polymer comprising two or more recurring units of the formula

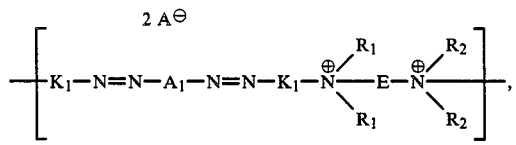

wherein
 $A_1$ is an aromatic bridging radical,
 E is an aliphatic, aromatic or aromatic heterocyclic bridging radical,
 each $K_1$ is independently the radical of a coupling component,
 each $R_1$ is independently $C_{1-4}$alkyl, phenyl($C_{1-4}$alkyl), $C_{2-4}$alkyl monosubstituted by hydroxy or halo or $C_{3-6}$alkenyl or
 both $R_1$'s taken together and with the nitrogen atom to which they are attached are morpholinium, piperidinium or pyrrolidinium,
 each $R_2$ is independently $C_{1-4}$alkyl, phenyl($C_{1-4}$alkyl), $C_{2-4}$alkyl monosubstituted by hydroxy or halo or $C_{3-6}$alkenyl or
 both $R_2$'s taken together and with the nitrogen atom to which they are attached are morpholinium, piperidinium or pyrrolidinium, and
 each $A^\ominus$ is independently a non-chromophoric anion, with the proviso that the recurring units are linked in such a way that a $K_1$ of one unit is linked to an $R_2$-bearing nitrogen atom of another unit.

2. A polymer according to claim 1 containing 2 to 25 recurring units of the formula

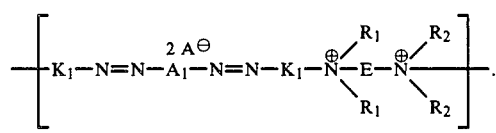

3. A polymer according to claim 2 containing 2 to 25 recurring units of the formula

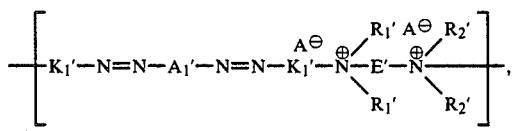

wherein $A_1'$ is

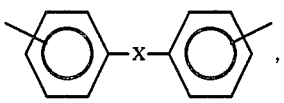

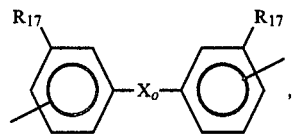

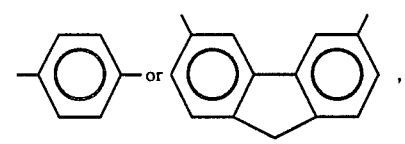

wherein
 each $R_{17}$ is independently halo, $C_{1-4}$alkyl or $C_{1-4}$alkoxy,
 X is a direct bond, linear or branched $C_{1-4}$alkylene,

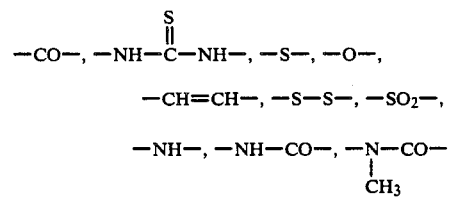

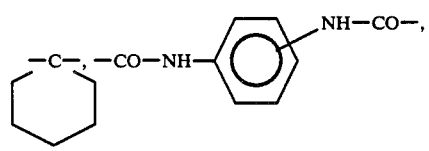

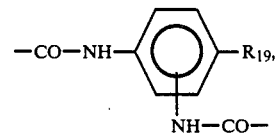

-continued
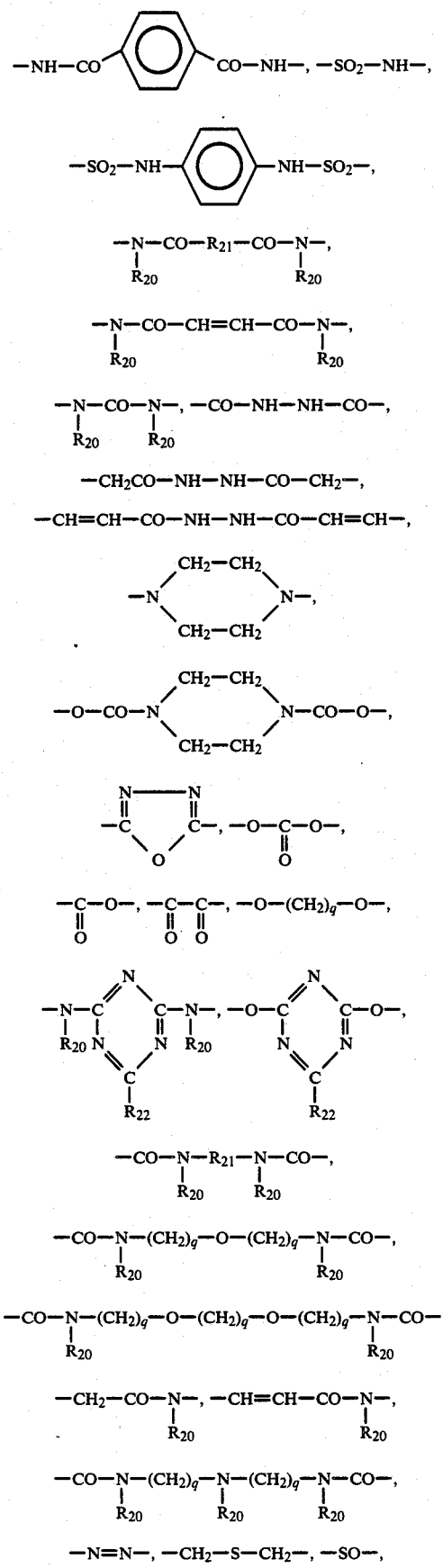
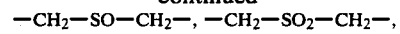
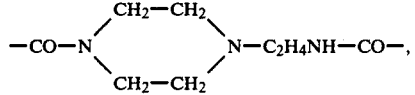
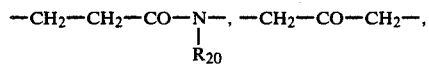
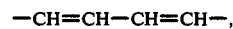
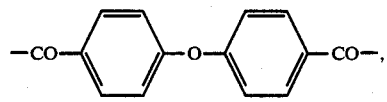
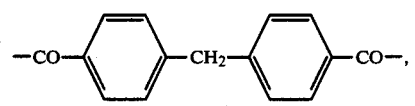
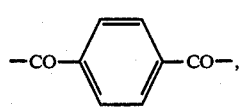
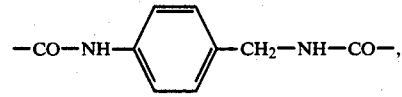
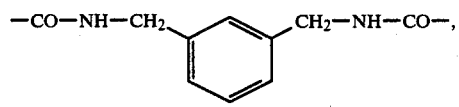
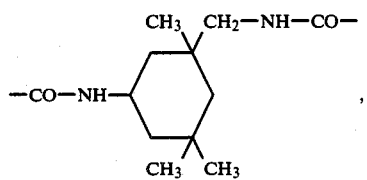
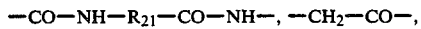
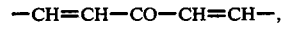
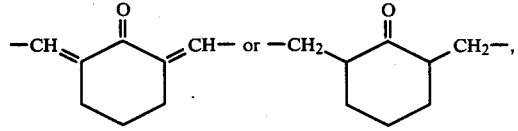
wherein
$R_{19}$ is halo, $C_{1-4}$alkyl or $C_{1-4}$alkoxy,
each $R_{20}$ is independently hydrogen or $C_{1-4}$alkyl,
$R_{21}$ is linear or branched $C_{1-4}$alkylene,
$R_{22}$ is halo, 2-hydroxyethylamino or N,N-di-(2-hydroxyethyl)amino, and
each q is independently 1, 2, 3 or 4, and
$X_o$ is a direct bond, linear or branched $C_{1-4}$alkylene, wherein
R$_{20}$, R$_{21}$ and R$_{22}$ are as defined above,
E is $-(CH_2)_r-$, $-CH_2CH(CH_3)CH_2-$, $-CH_2CH(CH_3)CH_2CH_2-$, $-CH_2-CH(CH_3)-CH(CH_3)-CH_2-$, $-CR_2-CH_2-Y-CH_2-CH_2-$, $-CH_2-CH=CH-CH_2-$, $-CH_2-CH=CH-CH_2-$ (cis/trans), $-CH_2-CH_2-CH=CH-CH_2-$, $-CH_2-C\equiv C-CH_2-$, and various aromatic and substituted groups including phenylene, chlorophenylene, methylphenylene, methoxyphenylene, dimethoxyphenylene, biphenylene, naphthylene, and quaternary ammonium-containing linkers as depicted.

-continued $-CH_2-CH_2-\overset{\underset{|}{CH_2-CH_2OH}}{\overset{\oplus}{N}}-CH_2-CH_2-A^{\ominus},$
$\overset{|}{CH_3}$ $-CH_2-CH_2-\overset{\underset{|}{CH_2-CH_2OH}}{\overset{\oplus}{N}}-CH_2-CH_2-A^{\ominus},$
$\overset{|}{CH_2-CH_2OH}$ $-CH_2-CH_2-\overset{\underset{|}{CH_3}}{\overset{\oplus}{N}}-CH_2-CH_2-CH_2-A^{\ominus},$
$\overset{|}{CH_2-CH_2OH}$ $-CH_2-CH_2\overset{\underset{|}{CH_3}}{\overset{\oplus}{N}}-CH_2-CH=CH-CH_2\overset{\underset{|}{CH_3}}{\overset{\oplus}{N}}-CH_2-CH_2-2A^{\ominus},$
$\overset{|}{CH_3}\qquad\qquad\qquad\overset{|}{CH_3}$ $-CH_2-CH_2\overset{\underset{|}{CH_3}}{\overset{\oplus}{N}}-CH_2-\phantom{X}\text{─}\phantom{X}\text{─}\phantom{X}-CH_2\overset{\underset{|}{CH_3}}{\overset{\oplus}{N}}-CH_2-CH_2-2A^{\ominus},$
$\overset{|}{CH_3}\qquad\qquad\qquad\qquad\overset{|}{CH_3}$ $-C_2H_4-NH-C_2H_4-NH-C_2H_4-,$
$-C_2H_4-NH-C_3H_6-NH-C_3H_6-,$
$-C_2H_4-NH-C_3H_6-NH-C_2H_4-,$
$-CH_2-CH_2-NH-C_6R_{12}-NH-C_2H_4-,$ $-C_2H_4-\overset{\underset{|}{CH_3}}{N}-C_2H_4-NH-C_2H_4-,$ $-C_2H_4-\overset{\underset{|}{CH_3}}{N}-C_2H_4-\overset{\underset{|}{CH_3}}{\overset{\oplus}{N}}-C_2H_4-A^{\ominus},$
$\qquad\qquad\qquad\overset{|}{CH_3}$ $-C_2H_4-NH-C_3H_6-NH-C_3H_6-NH-C_2H_4-,$ $-C_2H_4-NH-C_2H_4-\overset{\underset{|}{N}}{C_2H_4OH}-C_2H_4-,$ $-C_2H_4-\overset{\underset{|}{N}}{C_2H_5}-C_3H_6-, -C_2H_4-\overset{\underset{|}{N}}{CH_3}-C_3H_6-,$ $-CH_2-NH-CH_2-\phantom{X}\text{─}\phantom{X}-CH_2-NH-C_2H_4-,$ $-C_2H_4-NH-CH_2-\phantom{X}\text{─}\phantom{X}\text{─}\phantom{X}-CH_2-NH-C_2H_4-,$ $-C_4H_8-NH-C_2H_4-NH-C_4H_8-,$
$-C_4H_8-NH-C_3H_6-NH-C_3H_6-NH-C_4H_8-,$
$-CH_2-CH=CH-CH_2-NH-C_2H_4-NH-CH_2-CH=CH-CH_2-,$ $-CH_2-\phantom{X}\text{─}\phantom{X}-CH_2-NH-T-NH-CH_2-\phantom{X}\text{─}\phantom{X}-CH_2-,$ $-C_2H_4-N\underset{\diagdown\diagup}{\overset{\diagup\diagdown}{\phantom{XX}}}N^{\oplus}-C_2H_4-A^{\ominus},$ $-C_2H_4-NHCO-NH-C_2H_4-,$
$-C_2H_4-NH-CO-O-C_2H_4-,$ $-C_2H_4-NH-\overset{\underset{\|}{C}}{O}-CH_2-NH-C_2H_4-,$ -continued $-C_2H_4-O-\overset{\underset{\|}{C}}{O}-CH_2-NH-C_2H_4-,$ $-C_2H_4-NH-CO-C_2H_4NH-C_2H_4-,$
$-C_2H_4-NH-CO-CH_2-O-C_2H_4-,$ $-C_2H_4-NH-\phantom{X}\text{─}\phantom{X}-NH-CO-NH-\phantom{X}\text{─}\phantom{X}-NH-C_2H_4-$ or $-CH_2-\underset{\underset{|}{R_{20}}}{CH}-CO-NH(CH_2)_r-NH-CO-\underset{\underset{|}{R_{20}}}{CH}-CH_2-,$ wherein
each $R_{20}$ is independently hydrogen or $C_{1-4}$alkyl,
T is $-C_2H_4-$, $-C_3H_6-$, $-C_6H_{12}-$ or $-CH_2-\phantom{X}\text{─}\phantom{X}-CH_2-,$ Y is $-O-$, $-S-$, $-NH-$, $-\overset{\underset{|}{N}}{CH_3}-, -\overset{\underset{|}{N}}{C_2H_5}-; -\overset{\underset{|}{N}}{C_2H_4OH}-, -\overset{\underset{|}{\overset{\oplus}{N}}}{CH_3}-A^{\ominus}$ or $-\overset{\underset{|}{N}}{\phantom{X}\text{─}\phantom{X}}-,$ $Y_o$ is $-(CH_2)_q-$, $-O-$, $-S-$, $-CO-$, $-COO-$,
$-SO_2-$, $-SO_2-O-$, $-O-SO_2-O-$,
$-CO-NH-$, $-NH-CO-NH-$, $-NH-C-S-NH-$, $-NH-$ or $-\overset{\underset{|}{N}}{CH_3}-,$ wherein q is 1, 2, 3 or 4,
r is 2, 3, 4, 5 or 6,
s is 2, 3, 4, 5, 6, 7, 8, 9 or 10, and
t is 1, 2, 3, 4, 5 or 6,
each $K_1'$ is independently

[pyridone structure with $R_5$, $R_6$, HO, $(CH_2)_p-$], [pyridine structure with $R_5$, $R_6$, HN, $R_7$, $NH-(CH_2)_p-$],

[pyrazole-naphthol structure with $R_8$, $R_9$, $R_{10}$, OH, $CO-NH-(CH_2)_p-$]

$CR_3-CO-\overset{|}{CH}-CO-NH-\phantom{X}\text{─}\phantom{X}-NH-CO-(CH_2)_p-$ or -continued

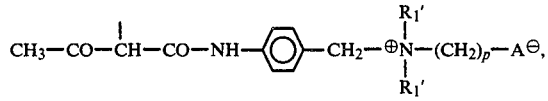

wherein
 $R_5$ is $C_{1-4}$alkyl, benzyl or phenyl,
 $R_6$ is hydrogen, cyano, —$CONR_{11}R_{12}$,

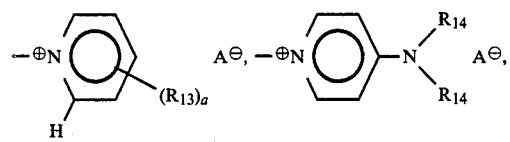

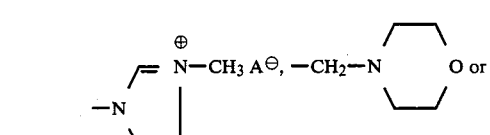

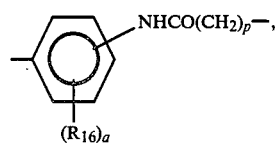

wherein
 each $R_{13}$ is independently $C_{1-4}$alkyl, $C_{1-4}$hydroxyalkyl or —$CONR_{14}R_{14}$,
 $R_7$ is hydrogen, $C_{1-4}$alkyl, $C_{1-4}$hydroxyalkyl, N,N-di-($C_{1-4}$alkyl)amino($C_{1-4}$alkyl) or $C_{1-4}$alkoxy($C_{1-4}$alkyl),
 $R_8$ is $C_{1-4}$alkyl or —$CONR_{11}R_{12}$,
 $R_9$ is —$(CH_2)_p$— or

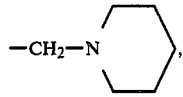

wherein
 each $R_{16}$ is independently halo, $C_{1-4}$alkyl or $C_{1-4}$alkoxy, and
 $R_{10}$ is hydroxy or amino,
wherein
 each $R_{11}$ and $R_{12}$ is independently hydrogen or $C_{1-4}$alkyl or
 —$NR_{11}R_{12}$ is pyrrolidino, piperidino or morpholino,
 each $R_{14}$ is independently hydrogen or $C_{1-4}$alkyl or
 —$NR_{14}R_{14}$ is pyrrolidino, piperidino or morpholino,
 each a is independently 0, 1 or 2,
 each p is independently 1, 2, 3, 4, 5 or 6, and
 $R_1'$ is as defined below,
 each $R_1'$ is independently $C_{1-4}$alkyl, phenyl($C_{1-4}$alkyl) or $C_{2-4}$alkyl monosubstituted by hydroxy or halo or
 two $R_1''$s taken together and with the nitrogen atom to which they are attached are morpholinium, piperidinium or pyrrolidinium, and
 each $R_2'$ is independently $C_{1-4}$alkyl, phenyl($C_{1-4}$alkyl) or $C_{2-4}$alkyl monosubstituted by hydroxy or halo, wherein each $A^\ominus$ is independently a non-chromophoric anion.

4. A polymer according to claim 3 wherein $R_6$ is hydrogen, cyano, —$CONR_{11}R_{12}$,

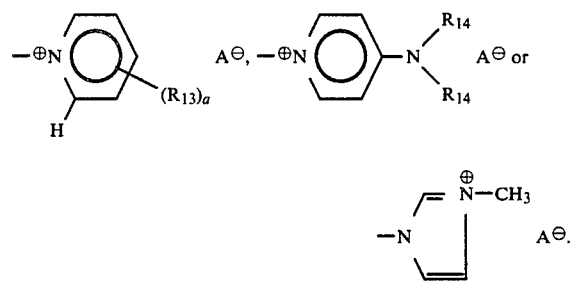

5. A polymer according to claim 3 containing 2 to 10 recurring units of the formula

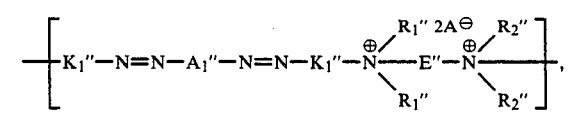

wherein $A_1''$ is

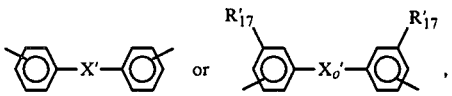

wherein
 each $R_{17}'$ is independently chloro, bromo, methyl, ethyl, methoxy or ethoxy,
 $X'$ is a direct bond, —$CH_2$—, —$(CH_2)_2$—, —$(CH_2)_3$—, —$(CH_2)_4$—, —S—, —O—, —CH=CH—, —NH—, —NH—CO—,

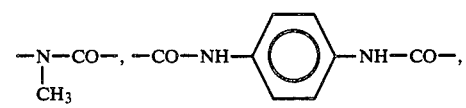

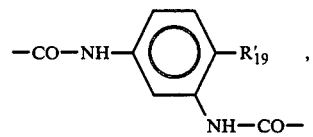

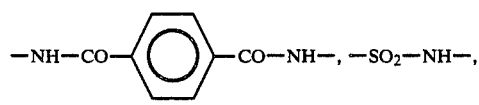

—NH—CO—$CH_2CH_2$—CO—NH—,
—NH—CO—$(CH_2)_4$—CO—NH—,

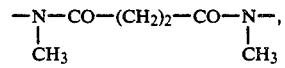

—NH—CO—CH=CH—CO—NH—,

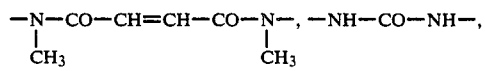

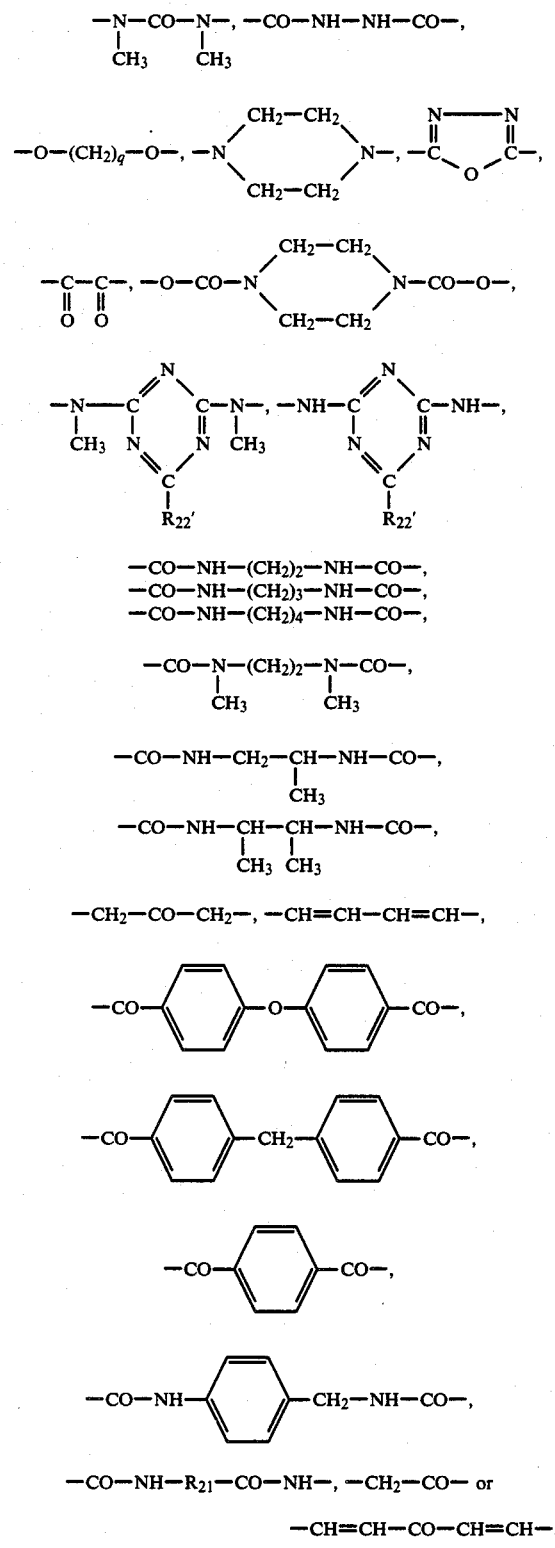
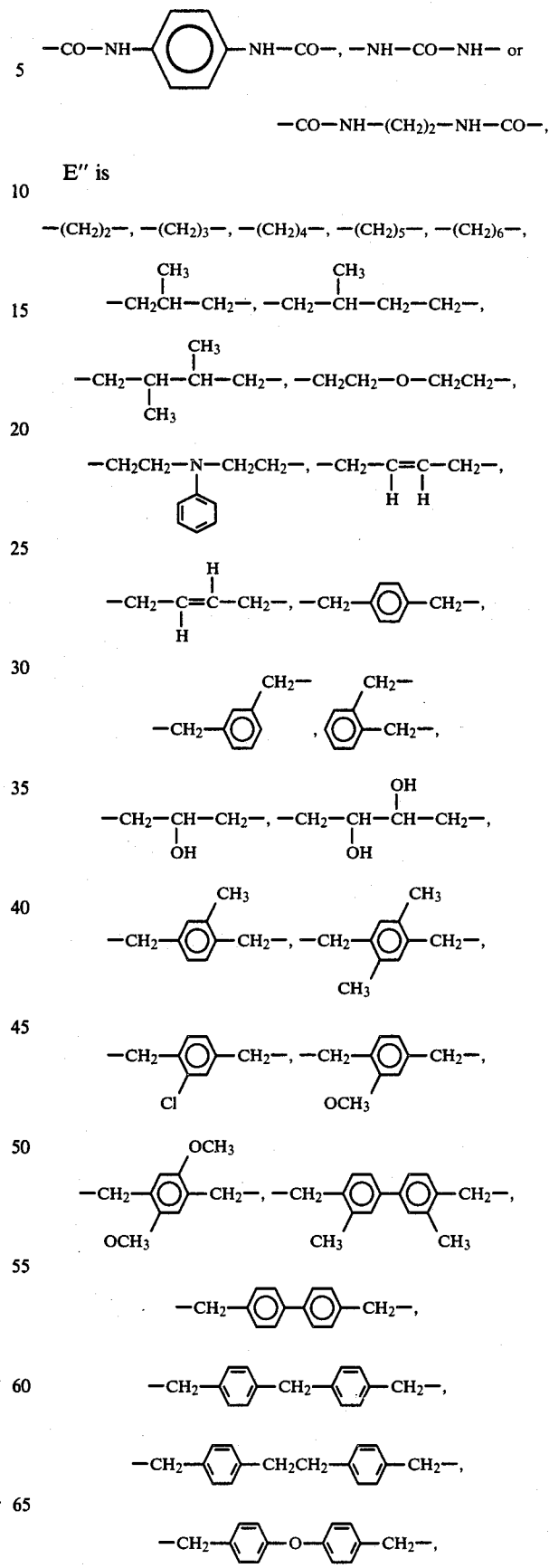
wherein
R$_{19}'$ is hydrogen, chloro, methyl or methoxy,
R$_{21}$ is linear or branched C$_{1-4}$alkylene, and
R$_{22}'$ is chloro, 2-hydroxyethylamino or N,N-di(2-hydroxyethyl)amino, and
X$_0'$ is a direct bond, —CH$_2$—, —(CH$_2$)$_2$—,

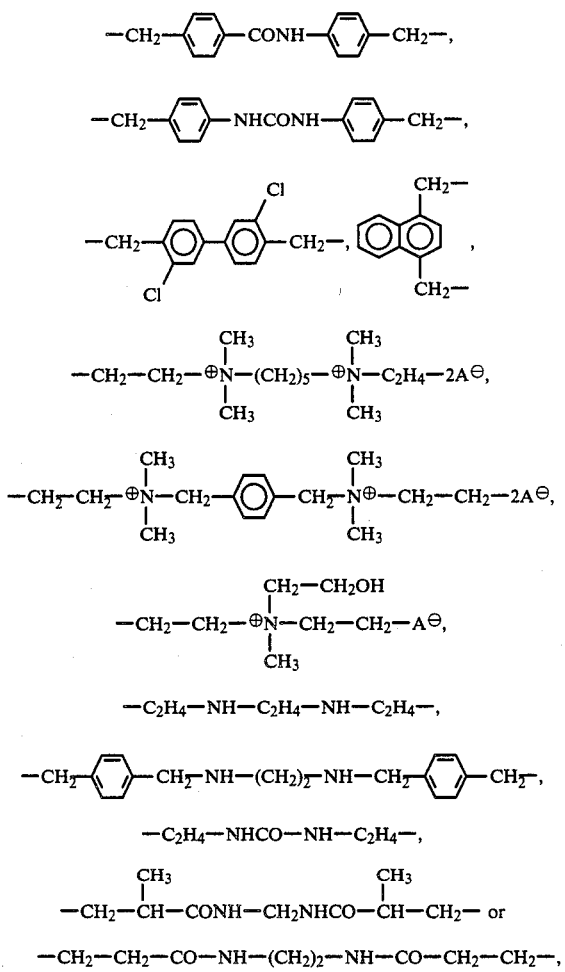

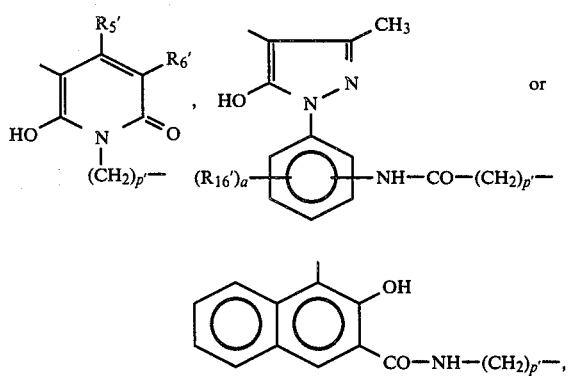

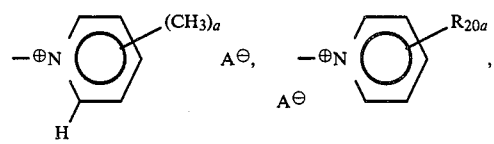

wherein
R$_5'$ is methyl or benzyl,
R$_6'$ is cyano, —CONR$_{11}'$R$_{12}'$,

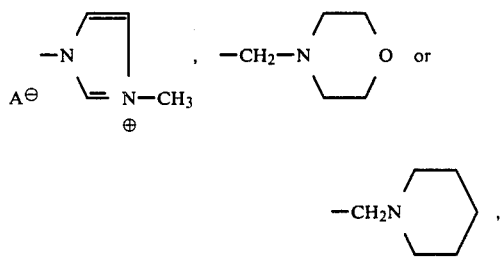

wherein each of
R$_{11}'$ and R$_{12}'$ is independently hydrogen, methyl or ethyl,
R$_{20a}$ is —CONH$_2$, —CON(C$_{1-2}$alkyl)$_2$ or 4—N(CH$_3$)$_2$, and a is 0, 1 or 2,
each R$_{16}'$ is independently chloro, bromo, methyl, ethyl, methoxy or ethoxy,
a is 0, 1 or 2, and
p' is 1, 2, 3 or 4,
each R$_1''$ is independently methyl or ethyl or both R$_1'''$'s taken together and with the nitrogen atom to which they are joined are morpholinium, and
each R$_2''$ is independently methyl or ethyl,
wherein
each A$^\ominus$ is independently a non-chromophoric anion.

6. A polymer according to claim 5 wherein
R$_5'$ is methyl,
R$_6'$ is cyano, —CONR$_{11}'$R$_{12}'$ or

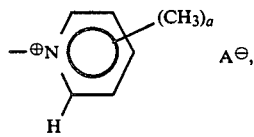

and
X' is other than —NHCO—.

7. A polymer according to claim 5 containing 3 to 6 recurring units of the formula

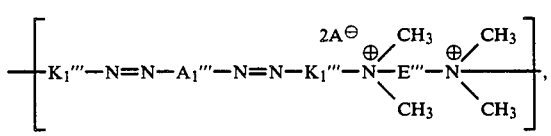

wherein A$_1'''$ is

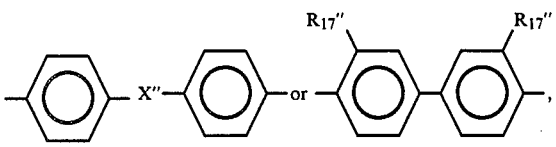

wherein
each R$_{17}''$ is independently chloro, methyl or methoxy, and
X'' is a direct bond, —CH$_2$—, —(CH$_2$)$_2$—, —NH—, —NH—CO—, —N—CO—,
                                                          |
                                                        CH$_3$ -continued
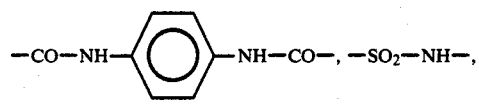
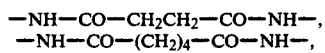
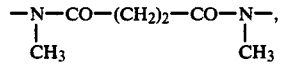
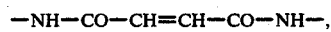
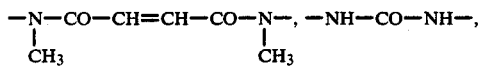
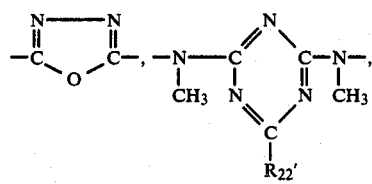
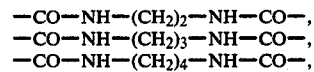
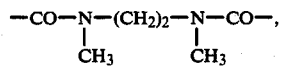
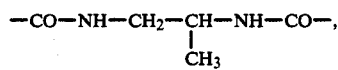
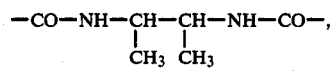
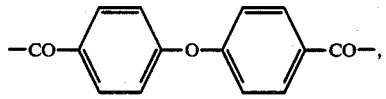
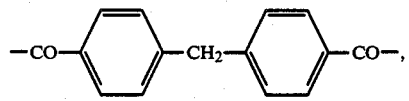
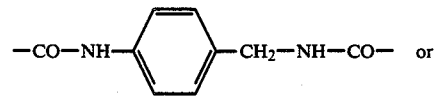
wherein
R$_{21}$ is linear or branched C$_{1-4}$alkylene, and
R$_{22}'$ is chloro, 2-hydroxyethylamino or N,N-di-(2-hydroxyethyl)amino,
E''' is —(CH$_2$)$_3$—, —(CH$_2$)$_4$—, —(CH$_2$)$_6$—,
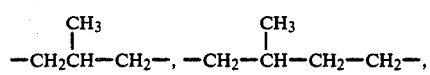
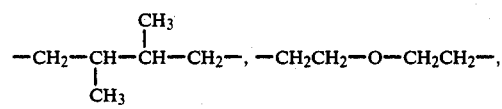
-continued
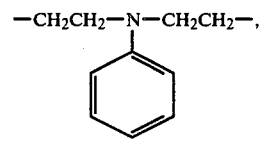
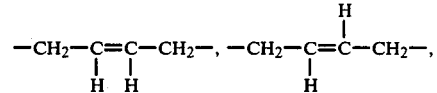
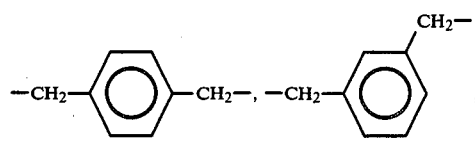
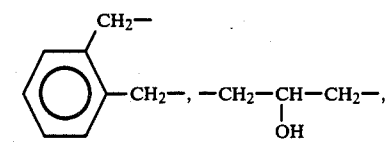
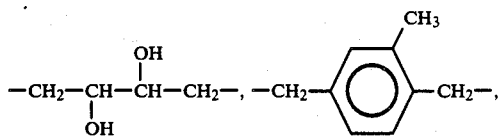
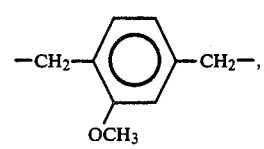
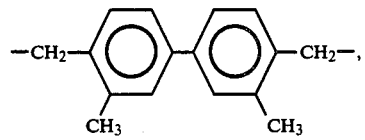
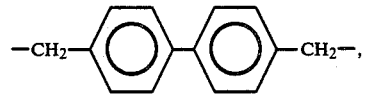
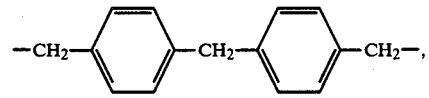
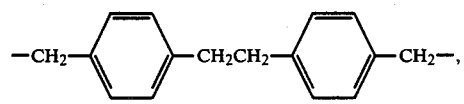
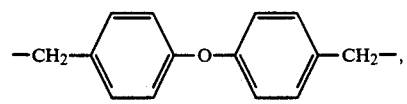

-continued

 or

—CH₂—CH₂—CO—NH—(CH₂)₂NH—CO—CH₂—CH₂—, and each $K_1'''$ is independently

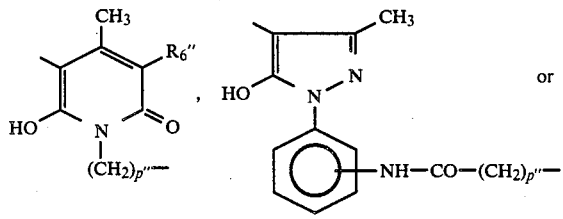 or

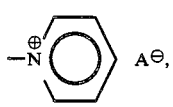, wherein
$R_6''$ is cyano, —CONH₂,

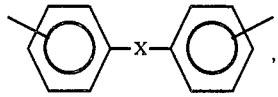, and p'' is 2 or 3,
wherein each $A^\ominus$ is independently a non-chromophoric anion.

8. A polymer according to claim 7 wherein $R_6''$ is cyano, —CONH₂ or $$-\overset{\oplus}{N}\bigcirc \quad A^\ominus,$$

and
X'' is other than —NHCO—.

9. A polymer according to claim 1 wherein
each $R_1$ is independently $C_{1-4}$alkyl, phenyl($C_{1-4}$alkyl) or $C_{2-4}$alkyl monosubstituted by hydroxy or halo or
both $R_1$'s taken together and with the nitrogen atom to which they are attached are morpholinium, piperidinium or pyrrolidinium, and
each $R_2$ is independently $C_{1-4}$alkyl, phenyl($C_{1-4}$alkyl) or $C_{2-4}$alkyl monosubstituted by hydroxy or halo.

10. A polymer according to claim 9 wherein $A_1$ is

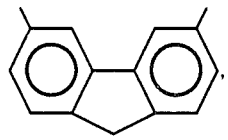

-continued

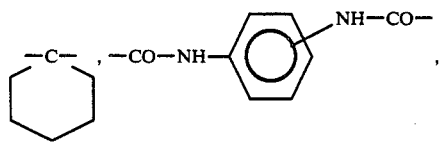, wherein
each $R_{17}$ is independently halo, $C_{1-4}$alkyl or $C_{1-4}$alkoxy,
X is a direct bond, linear or branched $C_{1-4}$alkylene, $$-CO-,\ -NH-\overset{S}{\overset{\|}{C}}-NH-,\ -S-,\ -O-,\ -CH=CH-;$$

$$-S-S-,\ -SO_2-,\ -NH-,\ -NH-CO-,\ -\underset{CH_3}{\overset{|}{N}}-CO-,$$

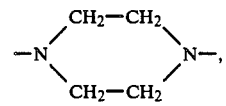

—CO—NH—⟨⟩—$R_{19}$,
                |
              NH—CO—

—NH—CO—⟨⟩—CO—NH—, —SO₂—NH—,

—SO₂—NH—⟨⟩—NH—SO₂—, $$-\underset{R_{20}}{\overset{|}{N}}-CO-R_{21}-CO-\underset{R_{20}}{\overset{|}{N}}-,\ -\underset{R_{20}}{\overset{|}{N}}-CO-CH=CH-CO-\underset{R_{20}}{\overset{|}{N}}-,$$

$$-\underset{R_{20}}{\overset{|}{N}}-CO-\underset{R_{20}}{\overset{|}{N}}-,\ -CO-NH-NH-CO-,$$

—CH₂CO—NH—NH—CO—CH₂—,

—CH=CH—CO—NH—NH—CO—CH=CH—,

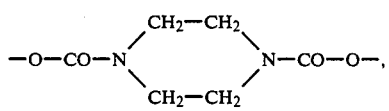

-continued

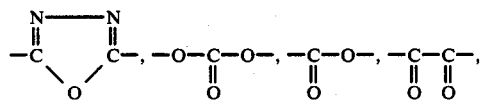
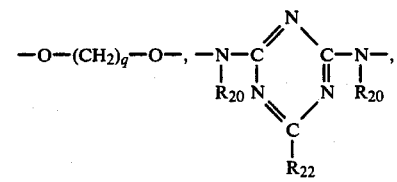
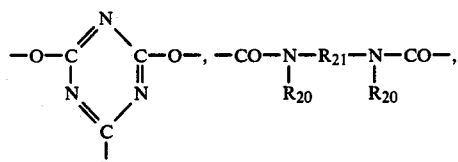
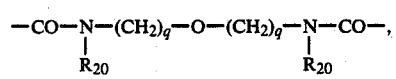
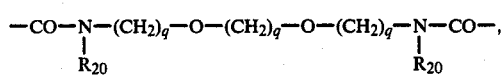
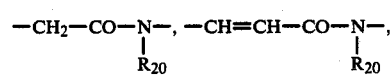
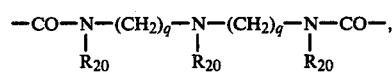
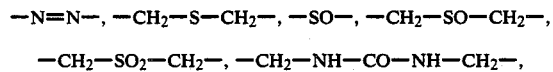

$-N=N-$, $-CH_2-S-CH_2-$, $-SO-$, $-CH_2-SO-CH_2-$, $-CH_2-SO_2-CH_2-$, $-CH_2-NH-CO-NH-CH_2-$, $-CH_2-NH-CS-NH-CH_2-$,

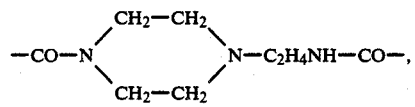

$-CH_2-CH_2-CO-N(R_{20})-$, $-CH_2-CO-CH_2-$, $-CH=CH-CH=CH-$,

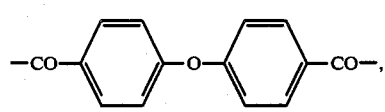

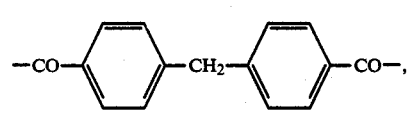

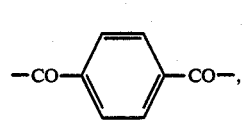

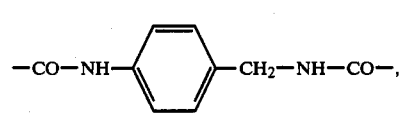

-continued

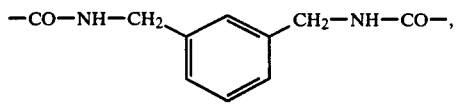

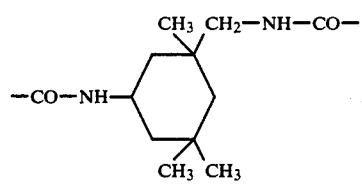

$-CO-NH-R_{21}-CO-NH-$, $-CH_2-CO-$, $-CH=CH-CO-CH=CH-$,

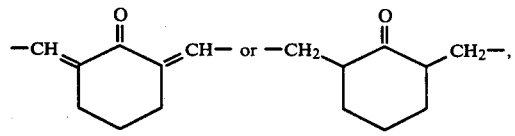

wherein
$R_{19}$ is halo, $C_{1-4}$alkyl or $C_{1-4}$alkoxy,
each $R_{20}$ is independently hydrogen or $C_{1-4}$alkyl,
$R_{21}$ is linear or branched $C_{1-4}$alkylene,
$R_{22}$ is halo, 2-hydroxyethylamino or di-(2-hydroxyethyl)amino, and
each q is independently 1, 2, 3 or 4, and
$X_o$ is direct bond, linear or branched $C_{1-4}$alkylene,

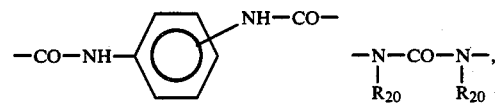 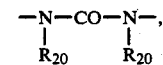

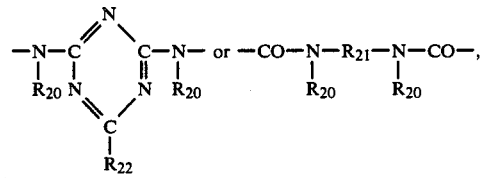

wherein $R_{20}$, $R_{21}$ and $R_{22}$ are as defined above.

11. A polymer according to claim 10 wherein E is

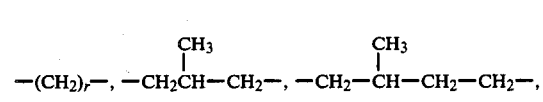

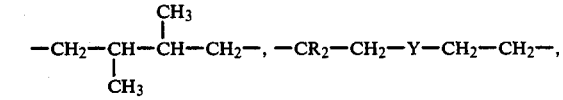

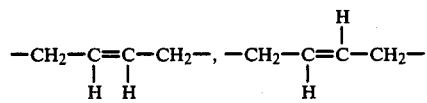

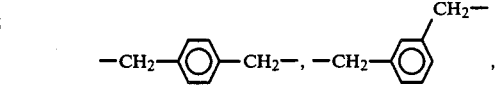

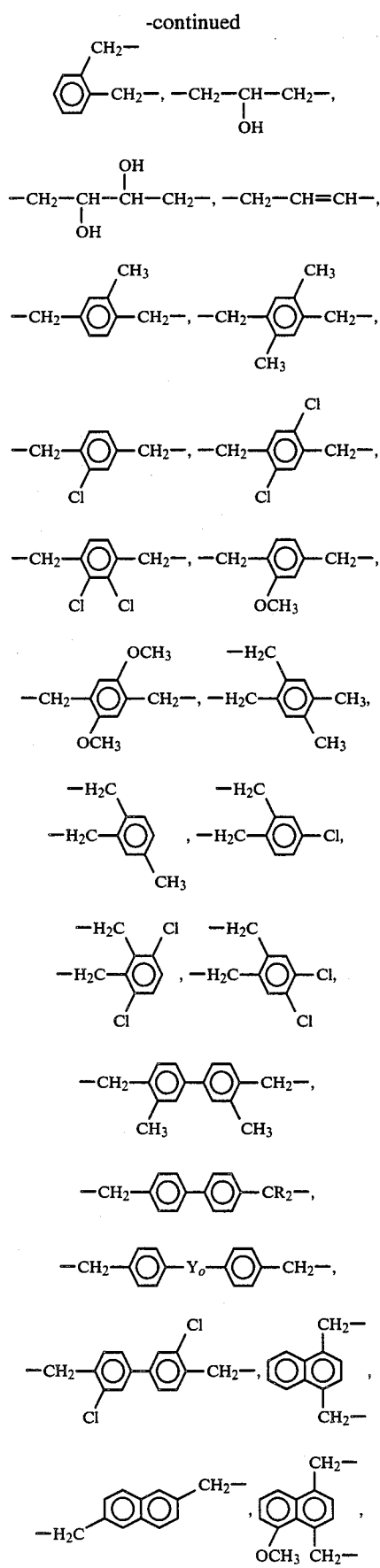
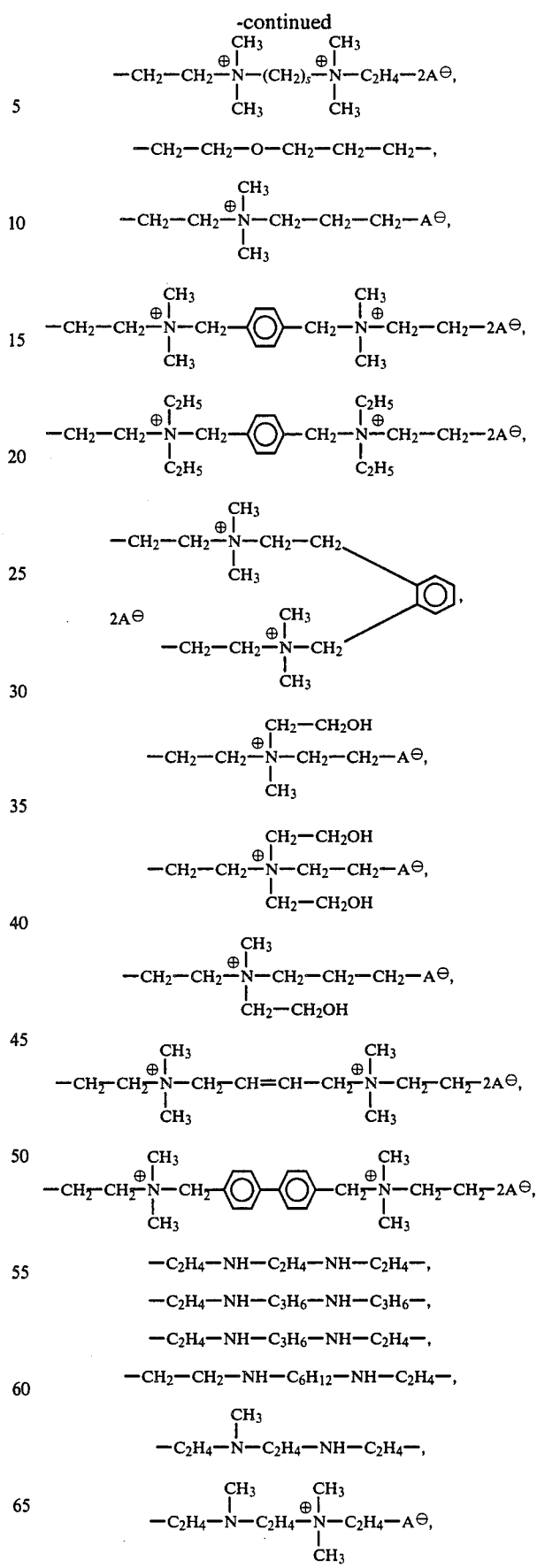

-continued
$-C_2H_4-NH-C_3H_6-NH-C_3H_6-NH-C_2H_4-$, $-C_2H_4-NH-C_2H_4-\underset{\underset{C_2H_4OH}{|}}{N}-C_2H_4-$, $-C_2H_4-\underset{\underset{C_2H_5}{|}}{N}-C_3H_6-$, $-C_2H_4-\underset{\underset{CH_3}{|}}{N}-C_3H_6-$, $-CH_2-NH-CH_2-\phantom{x}\bigcirc\phantom{x}-CH_2-NH-C_2H_4-$, $-C_2H_4-NH-CH_2-\phantom{x}\bigcirc-\bigcirc\phantom{x}-CH_2-NH-C_2H_4-$, $-C_4H_8-NH-C_2H_4-NH-C_4H_8-$, $-C_4H_8-NH-C_3H_6-NH-C_3H_6-NH-C_4H_8-$, $-CH_2-CH=CH-CH_2-NH-C_2H_4-NH-CH_2-CH=CH-CH_2-$, $-CH_2-\bigcirc-CH_2-NH-T-NH-CH_2-\bigcirc-CH_2-$, $-C_2H_4-\underset{\oplus}{N\diagup\diagdown N}-C_2H_4-A^\ominus$, $-C_2H_4-NHCO-NH-C_2H_4-$, $-C_2H_4-NH-CO-O-C_2H_4-$, $-C_2H_4-NH-\underset{\underset{O}{\|}}{C}-CH_2-NH-C_2H_4-$, $-C_2H_4-O-\underset{\underset{O}{\|}}{C}-CH_2-NH-C_2H_4-$, $-C_2H_4-NH-CO-C_2H_4NH-C_2H_4-$, $-C_2H_4-NH-CO-CH_2-O-C_2H_4-$, -continued
$-CH_2-\underset{\underset{R_{20}}{|}}{CH}-CO-NH(CH_2)_r-NH-CO-\underset{\underset{R_{20}}{|}}{CH}-CH_2-$, wherein
each $R_{20}$ is independently hydrogen or $C_{1\text{-}4}$alkyl,
T is $-C_2H_4-$, $-C_3H_6-$, $-C_6H_{12}-$ or $-CH_2-\bigcirc-CH_2-$, Y is $-O-$, $-S-$, $-NH-$, $-\underset{\underset{CH_3}{|}}{N}-$, $-\underset{\underset{C_2H_5}{|}}{N}-$, $-\underset{\underset{C_2H_4OH}{|}}{N}-$, $\overset{\overset{CH_3}{|}}{\underset{\underset{CH_3}{|}}{\overset{\oplus}{N}}}A^\ominus$ or $-\underset{\underset{\bigcirc}{|}}{N}-$, $Y_o$ is $-(CH_2)_q-$, $-O-$, $-S-$, $-CO-$, $-COO-$, $-SO_2-$, $-SO_2-O-$, $-O-SO_2-O-$, $-CO-NH-$, $-NH-CO-NH-$, $-NH-C-S-NH-$, $-NH-$ or $-\underset{\underset{CH_3}{|}}{N}-$, wherein
q is 1, 2, 3 or 4,
r is 2, 3, 4, 5 or 6,
s is 2, 3, 4, 5, 6, 7, 8, 9 or 10, and
t is 1, 2, 3, 4, 5 or 6,
wherein each $A^\ominus$ is independently a non-chromophoric anion.

12. A polymer according to claim 7 containing 3 to 6 recurring units of the formula $-C_2H_4-NH-\bigcirc-NH-CO-NH-\bigcirc-NH-C_2H_4-$ or wherein each $A^\ominus$ is a non-chromophoric anion.

13. A polymer according to claim 7 containing 3 to 6 recurring units of the formula

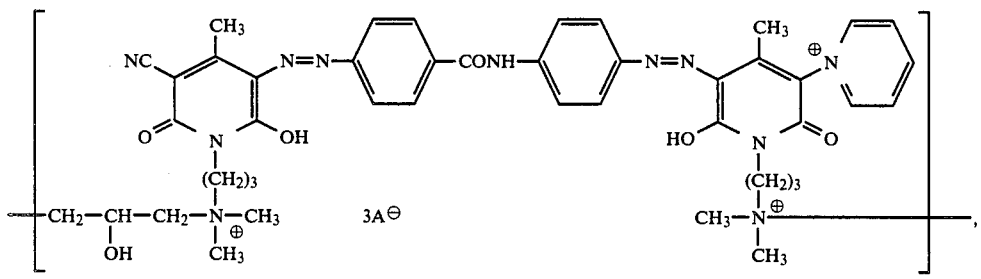

wherein each A⊖ is a non-chromophoric anion.

14. A polymer according to claim 4 containing 3 to 6 recurring units of the formula

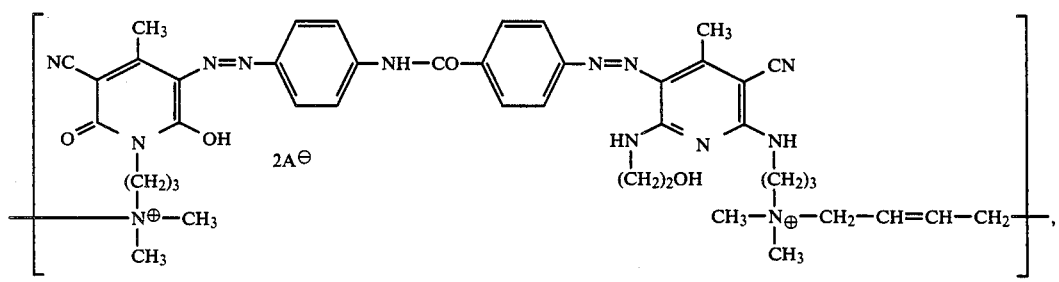

wherein each A⊖ is a non-chromophoric anion.

15. A polymer according to claim 7 containing 3 to 6 recurring units of the formula wherein each A⊖ is a non-chromophoric anion.

16. A polymer according to claim 7 containing 3 to 6 recurring units of the formula wherein each A⊖ is a non-chromophoric anion.

17. A polymer according to claim 4 containing 3 to 6 recurring units of the formula

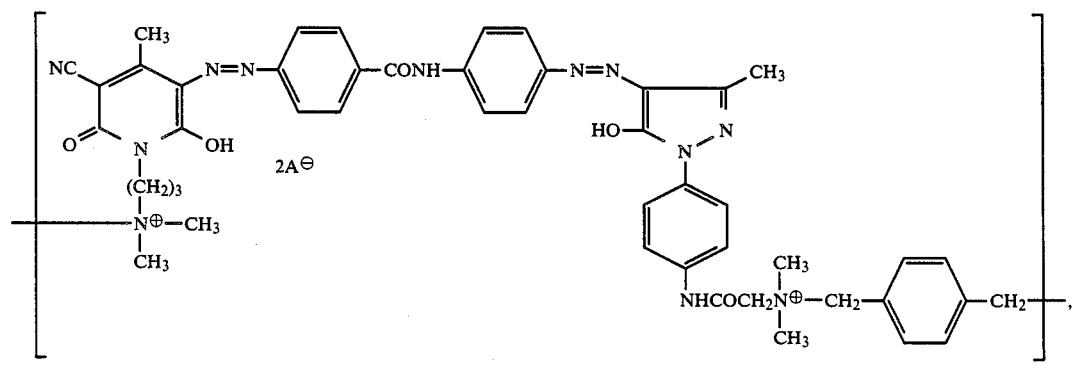

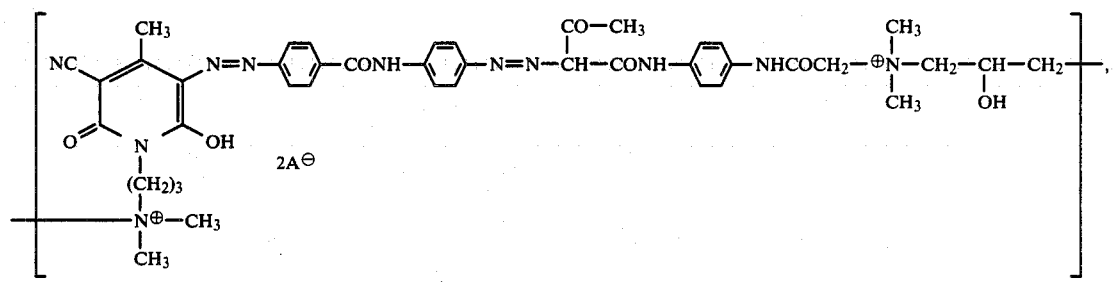
wherein each $A^\ominus$ is a non-chromophoric anion.
* * * * *